United States Patent
Ficara et al.

(10) Patent No.: US 9,882,806 B2
(45) Date of Patent: Jan. 30, 2018

(54) NETWORK DESCRIPTION MECHANISMS FOR ANONYMITY BETWEEN SYSTEMS

(71) Applicant: CISCO TECHNOLOGY, INC., San Jose, CA (US)

(72) Inventors: Domenico Ficara, Essertines-sur-Yverdon (CH); Davide Cuda, Morges (CH); Amine Choukir, Lausanne (FR)

(73) Assignee: Cisco Technology, Inc., San Jose, CA (US)

( * ) Notice: Subject to any disclaimer, the term of this patent is extended or adjusted under 35 U.S.C. 154(b) by 259 days.

(21) Appl. No.: 14/729,810

(22) Filed: Jun. 3, 2015

(65) Prior Publication Data

US 2016/0359728 A1    Dec. 8, 2016

(51) Int. Cl.
- *H04L 12/28* (2006.01)
- *H04L 12/721* (2013.01)
- *H04L 29/06* (2006.01)
- *H04L 12/751* (2013.01)
- *H04L 12/715* (2013.01)

(52) U.S. Cl.
CPC .............. *H04L 45/14* (2013.01); *H04L 45/02* (2013.01); *H04L 45/04* (2013.01); *H04L 63/00* (2013.01)

(58) Field of Classification Search
CPC ......... H04L 45/00; H04L 45/02; H04L 45/04; H04L 45/14; H04L 41/12; H04L 63/00
See application file for complete search history.

(56) References Cited

U.S. PATENT DOCUMENTS

| 6,829,221 | B1 | 12/2004 | Winckles et al. | |
| 8,954,601 | B1 * | 2/2015 | Patro | H04L 45/02 370/395.31 |
| 8,989,199 | B1 * | 3/2015 | Sella | H04L 45/42 370/395.31 |

(Continued)

OTHER PUBLICATIONS

Tizghadam, et al., "Betweenness Centrality and Resistance Distance in Communication Networks," IEEE Network, Nov./Dec. 2010, 7 pages; http://www.researchgate.net/profile/Ali_Tizghadam/publication/224194433_Betweenness_centrality_and_resistance_distance_in_communication_networks/links/00b49521552a064a31000000.pdf.

(Continued)

*Primary Examiner* — Kevin Mew

(57) ABSTRACT

Techniques are disclosed for exchanging anonymized information between autonomous systems. In one example, a method comprises accessing an eigenvalue, wherein the eigenvalue is based on topology data associated with the first autonomous system; encoding the eigenvalue into a message; and transmitting, by a network element located in the first autonomous system, the message to an external edge router located in the second autonomous system. A further method can comprise receiving, by a network component located in a first autonomous system, a message, wherein the message comprises an eigenvalue and the message is received from an external network element located in a second autonomous system; accessing another other eigenvalue, the another eigenvalue corresponding to an autonomous system different from the first autonomous system; analyzing the another eigenvalue and the eigenvalue; and executing, by the network element, an action based on the analyzing.

24 Claims, 15 Drawing Sheets

(56) References Cited

U.S. PATENT DOCUMENTS

| | | | | |
|---|---|---|---|---|
| 9,003,292 B2* | 4/2015 | Smith | ................ | H04L 12/2697 715/733 |
| 9,705,781 B1* | 7/2017 | Medved | ................ | H04L 45/02 |
| 2006/0039286 A1* | 2/2006 | Basu | ................ | H04L 45/02 370/238 |
| 2006/0165009 A1 | 7/2006 | Nguyen et al. | | |
| 2007/0217340 A1 | 9/2007 | Nakamichi et al. | | |
| 2009/0024549 A1* | 1/2009 | Johnson | ................ | H04L 41/12 706/46 |
| 2009/0168645 A1* | 7/2009 | Tester | ................ | H04L 41/0677 370/225 |
| 2009/0271508 A1* | 10/2009 | Sommers | ................ | H04L 43/0829 709/224 |
| 2011/0022706 A1* | 1/2011 | Borghetti | ................ | G06F 9/505 709/224 |
| 2013/0064139 A1* | 3/2013 | Kolavennu | ................ | H04L 45/02 370/255 |
| 2013/0124712 A1* | 5/2013 | Parker | ................ | H04L 41/5038 709/224 |
| 2013/0159479 A1* | 6/2013 | Vasseur | ................ | H04L 47/10 709/221 |
| 2013/0198372 A1* | 8/2013 | Wei | ................ | H04L 43/10 709/224 |
| 2014/0280338 A1* | 9/2014 | Metz | ................ | H04L 41/0853 707/774 |
| 2015/0117194 A1* | 4/2015 | Nishioka | ................ | H04L 45/02 370/230.1 |
| 2015/0220639 A1* | 8/2015 | Lawyer | ................ | G06F 17/30864 707/728 |
| 2016/0134527 A1* | 5/2016 | Kwak | ................ | H04L 45/586 370/352 |
| 2017/0091643 A1* | 3/2017 | Agrawal | ................ | G06N 7/005 |

OTHER PUBLICATIONS

Yan, et al., "Criticality analysis of Internet infrastructure," Los Alamos National Laboratory Publication No. LA-UR-08-05874, Computer Networks 54, Nov. 10, 2009, 14 pages; http://www.pitt.edu/~dtipper/3350/April_Paper4.pdf.

Nobre, et al., "Autonomic Networking Use Case for Distributed Detection of SLA Violations," Network Management Research Group, Jun. 20, 2014, 9 pages; http://tools.ietf.org/pdf/draft-irtf-nmrg-autonomic-sla-violation-detection-00.pdf.

Rekhter, et al., "A Border Gateway Protocol 4 (BGP-4)," Network Working Group, RFC 4271, Jan. 2006, 104 pages; http://tools.ietf.org/pdf/rfc4271.pdf.

Gredler, et al., "North-Bound Distribution of Link-State and TE Information using BGP," Inter-Domain Routing, Jan. 26, 2015, 45 pages; http://tools.ietf.org/pdf/draft-ietf-idr-ls-distribution-10.pdf.

Claise, et al., "Export of Structured Data in IP Flow Information Export (IPFIX)," Internet Engineering Task Force (IETF), RFC 6313, Jul. 2001, 71 pages; http://tools.ietf.org/pdf/rfc6313.pdf.

Claise, et al., "Specification of the IP Flow Information Export (IPFIX) Protocol for the Exchange of Flow Information," Internet Engineering Task Force, RFC 7011, Sep. 2013, 76 pages; http://tools.ietf.org/pdf/rfc7011.pdf.

Spielman, "Spectral Graph Theory and its Applications," Dept. of Computer Science Program in Applied Mathematics, Yale University, FOCS 2007 Conference, 48th Annual IEEE Symposium on of Computer Science; Oct. 20-23, 2007, Providence, RI, 75 pages; http://cs-www.cs.yale.edu/homes/spielman/sgta/SpectTut.pdf.

* cited by examiner

FIG. 2

| | 104a | 104b | 104c | 104d | 104e | 104f | 104g | 104h |
|---|---|---|---|---|---|---|---|---|
| 104a | -3 | 1 | 1 | 1 | 0 | 0 | 0 | 0 |
| 104b | 1 | -2 | 0 | 0 | 1 | 0 | 0 | 0 |
| 104c | 1 | 0 | -2 | 0 | 0 | 1 | 0 | 0 |
| 104d | 1 | 0 | 0 | -4 | 0 | 1 | 1 | 1 |
| 104e | 0 | 1 | 0 | 0 | -2 | 0 | 1 | 0 |
| 104f | 0 | 0 | 1 | 1 | 0 | -3 | 0 | 1 |
| 104g | 0 | 0 | 0 | 1 | 1 | 0 | -2 | 0 |
| 104h | 0 | 0 | 0 | 1 | 0 | 1 | 0 | -2 |

| | 104a | 104b | 104c | 104d | 104e | 104f | 104g | 104h |
|---|---|---|---|---|---|---|---|---|
| 104a | -3 | 0.7 | 0.91 | 0.67 | 0 | 0 | 0 | 0 |
| 104b | 0.7 | -2 | 0 | 0 | 0.83 | 0 | 0 | 0 |
| 104c | 1 | 0 | -2 | 0 | 0 | 0.95 | 0 | 0 |
| 104d | 0.65 | 0 | 0 | -4 | 0 | 0.6 | 0.79 | 0.78 |
| 104e | 0 | 0.83 | 0 | 0 | -2 | 0 | 0.99 | 0 |
| 104f | 0 | 0 | 0.96 | 0.6 | 0 | -3 | 0 | 0.49 |
| 104g | 0 | 0 | 0 | 0.79 | 0.99 | 0 | -2 | 0 |
| 104h | 0 | 0 | 0 | 0.78 | 0 | 0.57 | 0 | -2 |

$\lambda_1, \lambda_2, \lambda_3, \ldots, \lambda_n$ (Eigenvalues)

| EXEMPLARY TOPOLOGY | MEASURED BANDWIDTH | NETWORK CRITICALITY |
|---|---|---|
| 1 | 2.5 | 9.264308 |
| 2 | 4.958333 | 4.67514 |
| 3 | 7.4 | 3.136286 |
| 4 | 10.18 | 2.2495 |
| 5 | 12.673469 | 1.954625 |

| TYPE | NLRI TYPE |
|---|---|
| 1 | Node NLRI |
| 2 | Link NLRI |
| 3 | IPv4Topology Prefix NLRI |
| 4 | IPv6Topology Prefix NLRI |
| 5 | AnonymizedTopology NLRI |

414 — 1
416 — 2
418 — 3
420 — 4
422 — 5

402

| NLRI Type | Total NLRI Length | Link-State NLRI |
|---|---|---|
| 16 bits | 16 bits | Variable |

408 — NLRI Type
410 — Total NLRI Length
412 — Link-State NLRI

FIG. 4B

| Protocol ID | Identifier | Anonymized Topology Descriptors | Prefix Descriptors |
|---|---|---|---|
| 8 bits | 64 bits | Variable | Variable |

426 — Protocol ID
428 — Identifier
430 — Anonymized Topology Descriptors
432 — Prefix Descriptors
424 →

FIG. 4C

| TLV Code Point | Description | IS-IS TLV/Sub-TLV |
|---|---|---|
| TBD | Laplacian Spectrum | TBD |

436 — TLV Code Point
438 — Description
440 — IS-IS TLV/Sub-TLV
434 →

FIG. 4D

| Type | Length | Eigenvalue |
|---|---|---|
| 16 bits | 16 bits | Variable |

444 — Type
446 — Length
448 — Eigenvalue
442 →

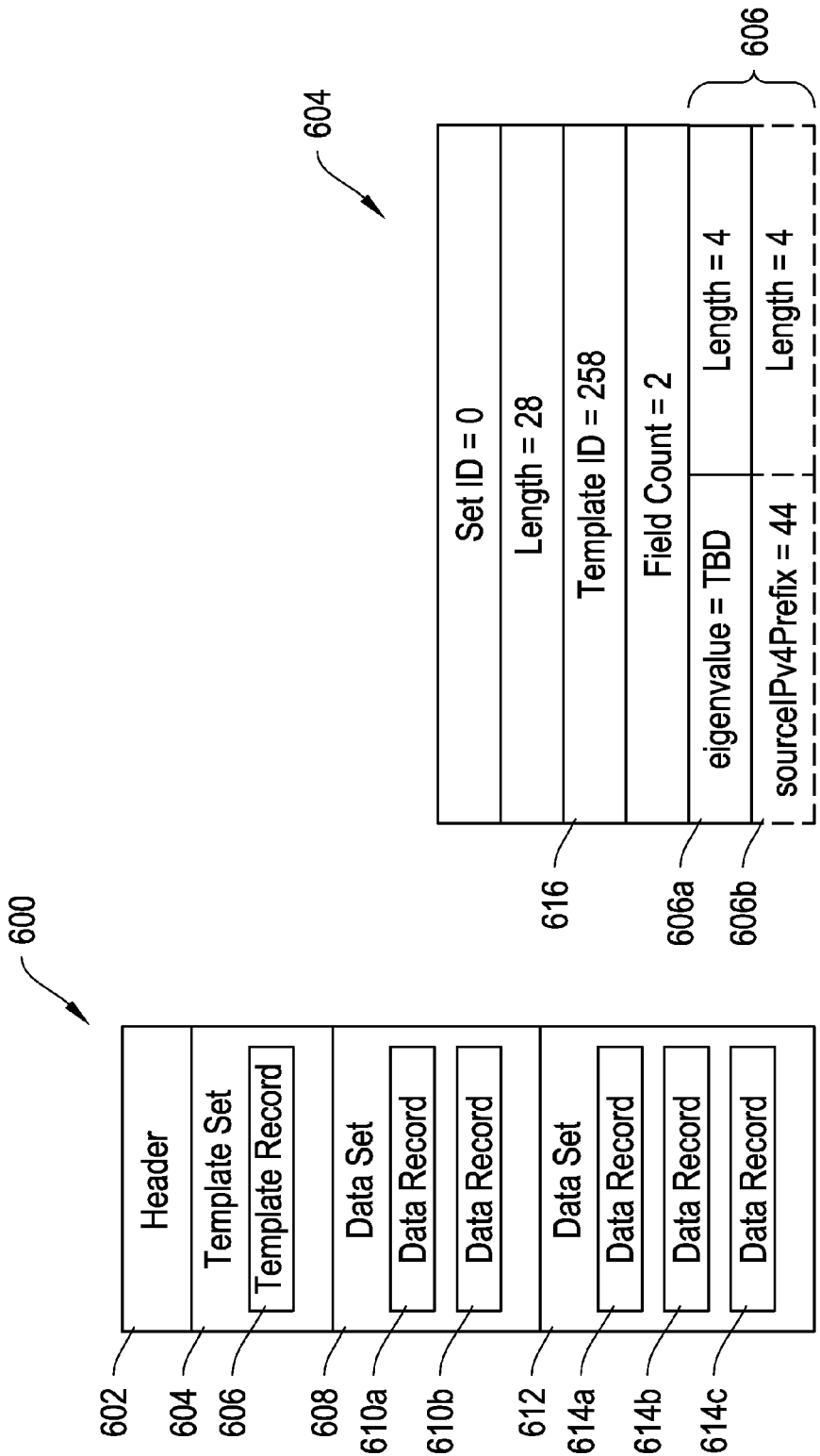

|   | 1 | 2 | 3 | 4 | 5 |
|---|---|---|---|---|---|
| 1 | 2 | $NC_{1,2}$ | $NC_{1,3}$ | 0 | 0 |
| 2 | $NC_{2,1}$ | 3 | 0 | $NC_{2,4}$ | $NC_{2,5}$ |
| 3 | $NC_{3,1}$ | 0 | 2 | 0 | $NC_{3,5}$ |
| 4 | 0 | $NC_{4,2}$ | 0 | 2 | $NC_{4,5}$ |
| 5 | 0 | $NC_{5,2}$ | $NC_{5,3}$ | $NC_{5,4}$ | 3 |

NETWORK DESCRIPTION MECHANISMS FOR ANONYMITY BETWEEN SYSTEMS

TECHNICAL FIELD

This disclosure relates in general to the field of communications and, more particularly, to enabling network description data to be exchanged within and/or between autonomous systems while maintaining the anonymity of the topology of the network described by the network description data.

BACKGROUND

An Autonomous System (AS) typically refers to a set of network elements under a single technical administration. An AS may be assigned one or more set of Internet Protocol (IP) addresses, which are used to uniquely identify each network element within the AS. Network elements, such as routers, use communication protocols to facilitate transmission of packets between one another. Such transmission of packets creates network flows, where a network flow refers to a stream of packets transmitted between a source network element and destination network element. A network flow is often defined by a tuple including information that uniquely identifies attributes of the source, destination, and communication protocol (e.g., a tuple may include each of a source IP address, a destination IP address, a source port number, a destination port number, and a network protocol). In hop-by-hop packet routing systems, which make up the vast majority of current Internet Protocol (IP) routing systems, a network flow may traverse many network elements during routing from a source to a destination.

When network errors, such a packet loss, occur, a network administrator can identify a cause of the error by utilizing network analysis tools to monitor/measure capabilities (e.g., address of each router on path of network flow, bandwidth capacity, utilization, router status logs, and the like) for a particular network flow on a hop-by-hop basis. Such network analysis tools provide useful troubleshooting information within a single network and/or within a single AS. However, administrative boundaries between Autonomous Systems (AS's) limit a network analysis tool's access to such capabilities and, therefore, pose a technical challenge to troubleshooting errors in network flows that traverse more than one AS.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIG. 2 is a simplified schematic diagram of exemplary network descriptors in accordance with some embodiments of the present disclosure;

FIG. 3B is a table illustrating exemplary network descriptors corresponding to a plurality of network in accordance with some embodiments of the present disclosure;

FIGS. 4A, 4B, 4C, 4D and 5 illustrate an exemplary extension to a gateway protocol in accordance with some embodiments of the present disclosure;

FIGS. 6A, 6B, 6C, and 6D illustrate an exemplary extension to a network protocol in accordance with some embodiments of the present disclosure;

FIG. 13B is a simplified schematic diagram of an exemplary network descriptor corresponding to the network of autonomous systems in accordance with some embodiments of the present disclosure.

DESCRIPTION OF EXAMPLE EMBODIMENTS OF THE DISCLOSURE

Overview

Figure 1:
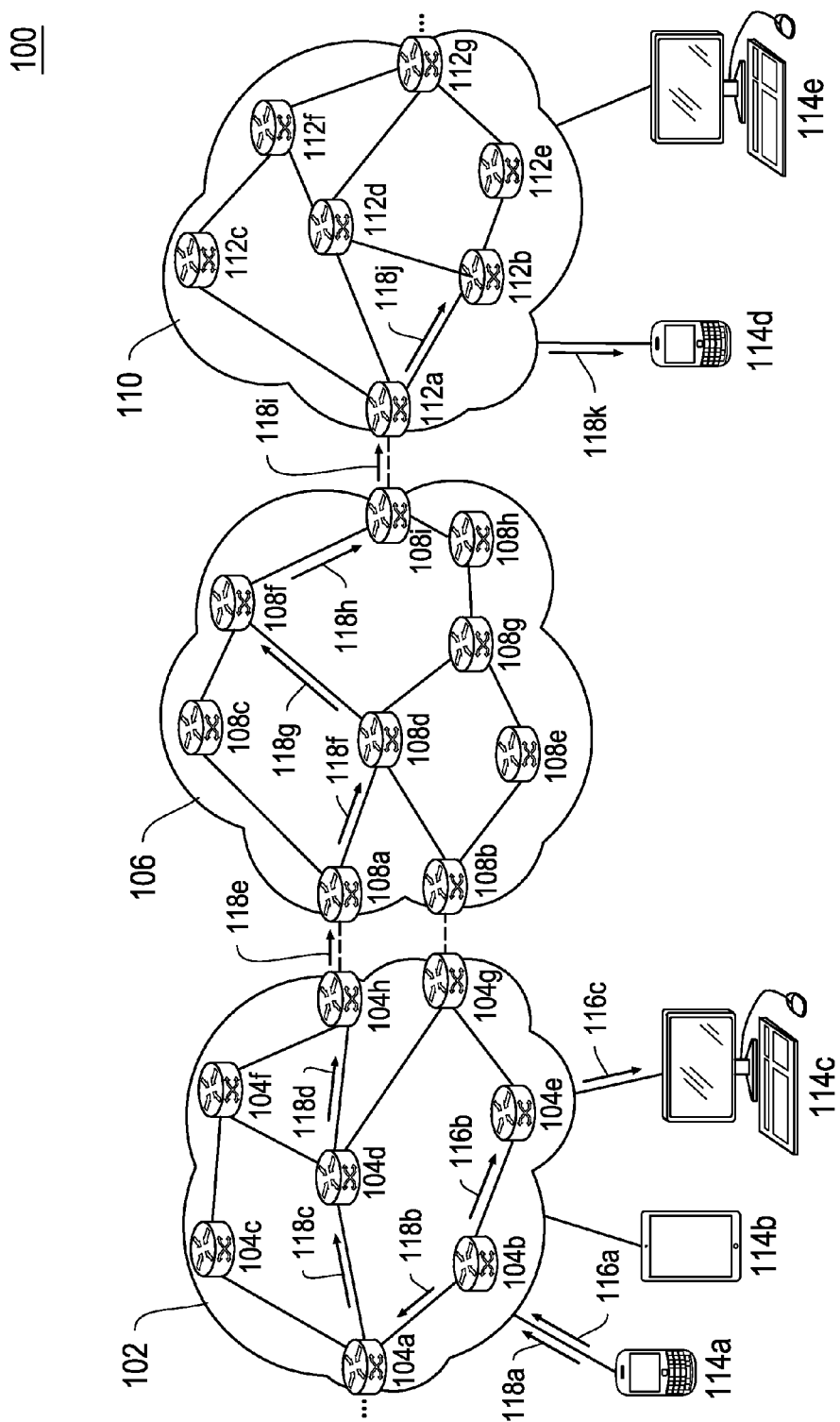
FIG. 1 is a simplified schematic diagram of a communication system 100 comprising multiple AS's in accordance with some embodiments of the present disclosure.

In some examples, a method for exchanging anonymized topology information between autonomous systems comprises: accessing, by an edge router located in a first autonomous system, at least one eigenvalue, wherein the at least one eigenvalue is based on topology data associated with the first autonomous system; encoding, by the edge router using a routing protocol, the at least one eigenvalue into a routing message; and transmitting, by the edge router, the routing message to an external edge router located in a second autonomous system. In further examples, the routing protocol is a standardized border gateway protocol (BGP) that is extended to include anonymized topology data and the routing message is a network layer reachability information (NLRI) tuple comprising: a type field and a value field; and the encoding the at least one eigenvalue into the routing message comprises: encoding an identifier corresponding to anonymous topology data into the type field of the NLRI tuple, and encoding the at least one eigenvalue into the value field of the NLRI tuple.

In other examples, a method for exchanging anonymized topology information between autonomous systems comprises: receiving, by an edge router located in a first autonomous system, a routing message, wherein the routing message is encoded, based on a routing protocol, comprising an eigenvalue and the routing message is received from an external network element located in a second autonomous system; accessing, by the edge router, one or more other eigenvalue, each of the one or more eigenvalue corresponding to an autonomous system that is different from the first autonomous system; analyzing, by the edge router, each of the one or more other eigenvalue and the eigenvalue; and executing, by the edge router, an action based on the analyzing. In further examples, the analyzing comprises: calculating a first value of network criticality based on the eigenvalues of the matrix; and calculating at least one additional value of network criticality based on the eigenvalues of the matrix.

In still other examples, a network element (e.g., located in a first autonomous system) comprises: a memory element storing electronic code; and a processor coupled to the memory element and operable to execute the electronic code, wherein the processor, when executing the electronic code, performs operations comprising: accessing at least one eigenvalue, wherein the at least one eigenvalue is based on topology data associated with the first autonomous system; encoding, using a routing protocol, the at least one eigenvalue into a routing message; and transmitting the routing message to an external edge router located in a second autonomous system.

In yet other examples, a network element (e.g., located in a first autonomous system) comprises: a memory element storing electronic code; and a processor coupled to the memory element and operable to execute the electronic code, wherein the processor, when executing the electronic code, performs operations comprising: receiving a routing message, wherein the routing message is encoded, based on a routing protocol, comprising an eigenvalue and the routing message is received from an external network element located in a second autonomous system; accessing one or more other eigenvalue, each of the one or more eigenvalue corresponding to an autonomous system that is different from the first autonomous system; analyzing each of the one or more other eigenvalue and the eigenvalue; and executing an action based on the analyzing.

In still other examples, a computer-readable non-transitory medium comprising one or more instructions, that when executed on a processor configure the processor to perform one or more operations comprising: accessing, by an edge router located in a first autonomous system, at least one eigenvalue, wherein the at least one eigenvalue is based on topology data associated with the first autonomous system; encoding, by the edge router using a routing protocol, the at least one eigenvalue into a routing message; and transmitting, by the edge router, the routing message to an external edge router located in a second autonomous system. In further examples, the routing protocol is a standardized border gateway protocol (BGP) that is extended to include anonymized topology data and the routing message is a network layer reachability information (NLRI) tuple comprising: a type field and a value field; and the encoding the at least one eigenvalue into the routing message comprises: encoding an identifier corresponding to anonymous topology data into the type field of the NLRI tuple, and encoding the at least one eigenvalue into the value field of the NLRI tuple.=

In other examples, a computer-readable non-transitory medium comprising one or more instructions, that when executed on a processor configure the processor to perform one or more operations comprising: receiving, by an edge router located in a first autonomous system, a routing message, wherein the routing message is encoded, based on a routing protocol, comprising an eigenvalue and the routing message is received from an external network element located in a second autonomous system; accessing, by the edge router, one or more other eigenvalue, each of the one or more eigenvalue corresponding to an autonomous system that is different from the first autonomous system; analyzing, by the edge router, each of the one or more other eigenvalue and the eigenvalue; and executing, by the edge router, an action based on the analyzing. In further examples, the analyzing comprises: calculating a first value of network criticality based on the eigenvalues of the matrix; and calculating at least one additional value of network criticality based on the eigenvalues of the matrix.

Example Embodiments

Within an Autonomous System (AS), network elements communicate with one another by routing packets using an interior gateway protocol (IGP) and by referring to certain common metrics. It has also become common to use several IGPs, such as e.g. Routing Information Protocol (RIP), Enhanced Interior Gateway Routing Protocol (EIGRP), Open Shortest Path First (OSPF) protocol, interior BGP (iBGP), and Intermediate System-to-Intermediate System (IS-IS) protocol, and sometimes several sets of metrics within an AS.

Between multiple AS's, neighboring AS's communicate with one another by routing packets using an Exterior Gateway Protocol (EGP), the current Internet standard EGP being the Border Gateway Protocol (BGP), one version of which is Version 4 (BGP-4) defined in RFC 4271, which is hereby incorporated by reference in its entirety. Another version is described in NORTH-BOUND DISTRIBUTION OF LINK-STATE AND TE INFORMATION USING BGP, draft-ietf-idr-ls-distribution-10, IETF working draft, January 2015 (referred to herein as "BGP-LS"), which is hereby incorporated by reference its entirety as well.

An AS can export information on network flows (or portions thereof) that traverse the AS using a protocol to exchange network flow information. For example, the IP Flow Information Export (IPFIX) protocol (referred to herein as "IPFIX protocol" and/or "IPFIX") serves as a means for transmitting flow information over a network. The IPFIX protocol is defined in Internet Engineering Task Force (IETF) Request for Comments (RFC) 7011, which is hereby incorporated by reference its entirety. Another version is described in EXPORT OF STRUCTURED DATA IN IP FLOW INFORMATION EXPORT (IPFIX), RFC 6313, IETF, July 2011, which is also hereby incorporated by reference its entirety. RFC 6313 extends IPFIX to include structured data types (e.g., lists or list of lists). An AS may use such a protocol to export network flow information to an external system such as mediator systems, network management systems, other AS's, and the like.

Each AS is "autonomous" (i.e., relatively independent from the other AS's) in a sense that is runs its own independent routing policies and unique IGPs. Exterior routing protocols were created to exchange routing information between different AS's. For example, the BGP defines an inter-AS routing protocol, where one of the primary functions is to exchange Network Layer Reachability Information (NLRI) by means of BGP speaking systems (also often referred to as "BGP speakers") sending update messages.

FIG. 1 is a simplified schematic diagram of a communication system 100 comprising multiple AS's in accordance with some embodiments of the present disclosure. In the example, of FIG. 1, three AS's are illustrated as a first AS 102, a second AS 106, and a third AS 110. In addition, endpoints 114a-e access at least one of the AS's through various points of attachment (e.g., network access points).

The first AS 102 includes network elements 104a-104h, each of which is operatively coupled to at least one other network elements within the first AS 102 as shown with solid lines between some of the network elements 104a-104h. The solid lines between some of the network elements 104a-104h may be viewed to represent exchange of packets according to one or more IGPs of the first AS 102, such as e.g. iBGP.

Similarly, the second AS 106 includes network elements 108a-108i, each of which is operatively coupled to at least one other node within the second AS 106 as shown with solid lines between some of the network elements 108a-108i. The solid lines between some of the network elements 108a-108i may be viewed to represent exchange of packets according to one or more IGPs of the second AS 106, such as e.g. iBGP.

Likewise, the third AS 110 includes network elements 112a-112g, each of which is operatively coupled to at least one other node within the third AS 110 as shown with solid lines between some of the network elements 112a-112g. The solid lines between some of the network elements 112a-112g may be viewed to represent exchange of packets according to one or more IGPs of the third AS 110, such as e.g. iBGP.

In some examples, the network elements may comprise routers. Routers in one AS that are configured to communicate with routers in other AS's are referred to as "edge routers", while routers in one AS that are only configured to communicate with other routes in the same AS are referred to as "core routers." In the illustration of FIG. 1, routers 104a, 104h, and 104g are edge routers, while routes 104b, 104c, 104d, 104e, and 104f are core routers of the first AS 102; routers 108a, 108b, and 108i are edge routers and routes 108c, 108d, 108e, 108f, and 108g are core routers of the second AS 106; and routers 112a and 112g are edge routers and routes 112b, 112c, 112d, 112e, and 112f are core routers of the third AS 110. In FIG. 1, the dashed lines between or extending from some of the edge routers may be viewed to represent exchange of packets according to an EGP, such as e.g. exterior BGP (eBGP).

Each of the edge routers is configured to communicate, via e.g. eBGP, with one or more edge routers in another AS. As an illustrative example, the edge routers may be service nodes (e.g. L3VPN, Layer 2 Virtual Private Network (L2VPN) endpoints) that exchange service state via BGP and Label Distribution Protocol (LDP).

A pair of edge routers from different AS's configured to communicate with one another are referred to as "EGP neighbors", e.g. "eBGP neighbors". In the illustration of FIG. 1, one pair of EGP neighbors includes routers 104h and 108a, while another pair of neighbors includes routers 104g and 108b, and still another pair of neighbors includes routers 108i and 112a. Other edge routers shown in FIG. 1 may also have their respective neighbors in further AS's, which further AS's are not shown in FIG. 1.

Each of endpoints 114a-e can establish network connections to an AS and can generate network flows utilizing such connections. For example, the endpoints 114a, 114b, and 114c are connected to the first AS 102; the endpoints 114d and 114e are connected to the third AS 110. The endpoint 114a generates each of network flows 116 and 118. The network flow 116 comprises network flow portions 116a-116c (e.g., streams or transmissions of packets) corresponding to hops between network elements. The network flow 118 comprises network flow portions 118a-118k (e.g., streams or transmissions of packets) corresponding to hops between network elements.

A network flow may be limited to a single AS. For example, endpoint 114a generates a network flow 116, where the network flow is limited to the first AS 102. The flow 116 originates at endpoint 114a from which portion 116a is transmitted to the router 104b (e.g., representing one hop). Likewise, the router 104b routes the portion 116b to router 104e (e.g., representing one hop). In turn, router 104e routes the portion 116c to endpoint 114c (e.g., representing one hop). Thus, the network flow 116 only hops between network elements in the first AS (and does not traverse an edge to another AS).

A network flow may traverse boundaries between two or more AS's. For example, endpoint 114a generates a network flow 118, where the network flow traverses each of the first AS 102, the second AS 106, and the third AS 110. The flow 118 originates at endpoint 114a and hops (e.g., transmitted via IGP) between each of routers 104b, 104a, 104d, and 104h, in turn, in the first AS 102. The edge router 104h in the first AS 102 transmits the flow 118 (e.g., via EGP) between to edge router 108a in second AS 106. From the edge router 108a in second AS 106, the flow 118 hops (e.g., transmitted via IGP) between each of routers 108d, 108f, and 108i, in turn, in the second AS 106. The edge router 108i in the second AS 106 transmits the flow 118 (e.g., via EGP) between edge router 112a in third AS 110. From the edge router 112a in third AS 110, the flow 118 hops (e.g., transmitted via IGP) to router 112b in the second AS 106. The router 112b routes the portion 118k to endpoint 114d, the endpoint 114d being connected to the third AS 110. Thus, the network flow 118 hops between network elements in a plurality of AS's (and is not limited to a single AS).

In an exemplary operation of communication system 100 (FIG. 1), the network flows 116 and 118 correspond to data generated by a media application. Each of endpoints 114a, 114c, and 114d execute code associated with conferencing or meeting technology such as video conferencing architectures (e.g., TELEPRESENCE), web camera devices, personal computing applications (e.g., SKYPE), multimedia meeting platforms (e.g., MEETINGPLACE, WEBEX, other virtual meeting clients, etc.), desktop applications, or any other suitable application in which voice data and/or video data is sought to be managed.

In one embodiment, each of endpoints 114a, 114c, and 114d execute a virtual meeting client operable to connect the three endpoints in a virtual meeting with one another. The network flows may correspond to packets of voice data and/or video data transmitted from endpoint 114a to each of endpoints 114c and 114d (e.g., via virtual meeting servers). Although, not shown in FIG. 1, corresponding network flows may exist from each of endpoints 114c and 114d to endpoint 114a. In such an embodiment, network congestion or other network issues (within any of the first AS 102, the second AS 106, or the third AS 110) may cause a problem of routers dropped packets and, ultimately, decrease the quality of service provided to the virtual meeting clients (e.g., resulting in decreasing quality of the voice data and/or video data rendered by the virtual meeting client).

Identifying a source of such a problem (and other problems affecting network flows) often requires use of network analysis tools. A network analysis tool (e.g., traceroute, ping, Internet Control Message Protocol (ICMP) "echo" function, CISCO MEDIATRACE, any packet tracing function, or any other network analysis tool) deployed within the first AS 102 (e.g., executed by any of 104a-f and/or the endpoints 114a-c) may collect information, hop-by-hop, on the network flow 116 as it traverses the network elements within the first AS 102. This information may be used to identify a source of the problem in the flow 116 (e.g., to identify network element 104e is operating at 99% of its total bandwidth capacity). However, for network flow 118, identifying a source of a problem may be more challenging.

For example, each of endpoints 114a and 114d may detect a decrease in quality of service of network flow 118. Based on detecting the decrease in quality of service, each of endpoints 114a and 114d can, for instance, execute a network analysis tool such as MEDIATRACE and retrieve information from within their respective AS. The endpoints can perform such an analysis to determine whether problems exist in the portions of the flow within their respective AS (e.g., endpoint 114a determines whether problems exist in flow 118a-d and 118e within the first AS 102 and endpoint 114d determines whether problems exist in flow 118j-k within the third AS 110). However, no information is available about the second AS since it is under different network administrators than the first AS and the second AS. In this example, eliminating the first AS 102 and the third AS 110 may allow identification of the second AS 106 as the source of the problem (e.g., based only on a process of elimination). However, if there were more than one AS between the first AS 102 and the third AS 110, the problem is only further exacerbated by the need to determine which of the AS's is the source of a problem that lies between the first AS 102 and the third AS 110.

Because the network flow 118 traverses all three AS's, some network analysis tools may not be effective to collect the requisite information to identify the source of the problem. The network analysis tool may be limited by the technical capabilities of the tool (e.g., the tool does not have the ability to access such information outside of the AS in which it operates). Some network analysis tools have the technical capabilities to collect such information across multiple autonomous systems. However, collecting the information across multiple autonomous systems network may require each AS to expose information regarding network details to an external system. However, many administrators choose not to share information such as topology details, identity of a nodes in the topology, network address of a node, a type of device for a node, interfaces used by a node, differentiated service values associated with a node, a Time to live (TTL) associated with a node, bandwidth of links, utilization of links, delay, link length, queue length for class and link, memory utilization, and/or anything related to individual links. Administrators setup up their AS and internal networks to not share such information with other autonomous systems based on concerns over as privacy, security, confidentiality, and the like. For example, administrators may worry that exposing that a network element is running at a high CPU (i.e., memory utilization) may make the network element a target of Denial of Service (DoS) attack. Administrators face competing goals of: exchanging, with external systems, information usable for network analysis (e.g. trouble shooting between AS's), and preventing exposure of private network data.

Enforcing Service Level Agreements (SLAs) are another context in which autonomous systems may need to share network details with one another. For example, network operators and service providers want to know how their network flows are treated (e.g., whether a service provider is meeting service level objectives, whether the service provider meets metrics such as uptime, maximum percentage of dropped packets, and the like) across different autonomous systems. Indeed, when flows need to traverse administrative domains it is challenging to ensure that quality of services or any type of policies are enforced on them. Again, this may be due to network details and topology being kept private. The problems discussed above with respect to network analysis tools also contribute to a challenge of determining if and how policies are applied to network flows in an external AS. This, in turn, prevents a fine-grained assessment of SLAs between end customers and service provider, amongst service providers, and among corporate customers, which can results in a tedious process to isolate faults.

Each of the above examples illustrates a need for systems that enable transmission of network descriptors (e.g., usable for fault detection and assessment of network performance) between autonomous systems while maintaining the privacy or anonymity of network details of the autonomous systems. When a network flow traverses multiple autonomous systems, network administrators are faced with a technical problem of trying to identify the source of network flow issues at multiple scales. For example, such identification may include identifying which of a plurality of autonomous systems is a source (i.e., at the scale of an AS) and/or locating a network within a particular autonomous system in which the problem is located (i.e., at the scale of networks within the AS, subnets in the AS, or individual devices within the AS and/or a subnet therein).

The systems and methods disclosed here in address such problems (and others) by not only providing network descriptors that anonymize the topology of an AS or network therein that it represents but also provides new data formats for encoding such network descriptors. For example, a new BGP extension and a new IPFIX extension, presented in the present specification, add anonymized topological data to TLVs within, e.g., BGP NLRIs and IPFIX Template Records and Data Records. Such extensions enable transmission of anonymized topological data between multiple AS's and, advantageously, maintain the privacy of details of network topology. In addition, such extensions improve the performance of each AS and improve the operation of network components therein (e.g., by automating the ability to troubleshoot a problem and/or increasing the speed at which a network error may be corrected).

The network descriptors disclosed herein are generated based on, among other things, graph theory to mathematical representations of the topology of a network. Such mathematical representations may include graph-theoretic data structures such as matrices and/or lists. For example, adjacency matrices and Laplacian matrices can applied to represent the topology of a network. The matrices represent nodes and links of a graph (e.g., corresponding to network elements and communication links in a network). A Laplacian matrix is an adjacency matrix with diagonal elements that store the degree of nodes. For example, for an Laplacian matrix having m number of rows and n number of columns (where m and n are greater than zero), the generic element $a\_i\_j$ (i.e., at row i and column j, where $0 \le i \le m$ and $0 \le j \le n$) is:

$a\_i\_j=1$ if node i and node j are directly connected by a link (i !=j);

$a\_i\_j=0$ if node i and node j are not directly connected (i !=j);

$a\_i\_i=-\deg(i)$;

Where deg(i) is the degree of node i (e.g., a degree of connectivity). For undirected graphs, the degree may be the count of the number of links directly connected to node i. For directed graphs, the degree may be the count of a number of outbound links from the node i, a number of inbound links to the node i, or the sum thereof.

One or more eigenvalue of a Laplacian matrix may be used as a network descriptor, in some embodiments of the present disclosure. The eigenvalues may be referred to herein as the "graphical spectrum" of a network. Throughout the present disclosure eigenvalues are sometimes referenced using a Greek lambda ($\lambda$). If the eigenvalues are organized in ascending order and labeled beginning at 1 and increasing therefrom, the eigenvalues can be represented as $\lambda\_1 < \lambda\_2 < \lambda\_3 \ldots \lambda\_n$. The first eigenvalue ($\lambda\_1$) is less than or equal to the second eigenvalue ($\lambda\_2$), the second eigenvalue ($\lambda\_2$) is less than or equal to the third eigenvalue ($\lambda\_3$), etc. Eigenvalues of the Laplacian matrix provide information about the connectivity of a graph. In particular, the second eigenvalue is also called algebraic connectivity because the value corresponds to a level of connectivity of the graph. The algebraic connectivity is mathematically dependent (e.g., a dependent variable) on the number of nodes in the graph (e.g., corresponding to network elements in a network) and on the number of links connecting the nodes in the graph. The algebraic connectivity increases as the connectivity of the graph increases (e.g., as an average degree of nodes in the network increases). However, the eigenvalues are anonymous in the sense that they maintain the privacy of details of network topology. For example, the eigenvalues of a Laplacian corresponding to a network topology can be safely share without exposing specific topological data such as, e.g.,: an adjacency matrix corresponding to the network topology, routing tables, The eigenvalues may be used as a basis to determine properties of a network without exposing finite detail of the network. The eigenvalues provide a reliable, and stable indication of the connectivity of a network, its sensibility to congestion and path changes, and traversal cost, while not uncovering any details about the internals of the network. For example, spectral theory tools enable the determination of network attributes based on eigenvalues and/or eigenvectors. Such spectral theory tools are described further below (e.g., with respect to network criticality index).

Other values may be used as a network descriptor, in some embodiments of the present disclosure. For example, network criticality can also be computed as a function of the graphical spectrum of the Laplacian matrix of the network graph (e.g., as the sum of the inverses of the graphical spectrum). The trace of a matrix is also the sum of its graphical spectrum (i.e., its eigenvalues). The eigenvalues of the inverse of a matrix are the inverse of the eigenvalues of the matrix (e.g., if lambda ($\lambda$) is a eigenvalue of a matrix A, then $\lambda^{-1}$ (i.e., the inverse of lambda) is an eigenvalue of $A^{-1}$ (i.e., the inverse of matrix A)). Thus, the sum of the inverses of the graphical spectrum (e.g., the eigenvalues) is equivalent to the trace of generalized inverse of the Laplacian matrix. Network criticality is derived from a Laplacian matrix in "Betweenness Centrality and Resistance Distance in Communication Networks" by A. Tizghadam and A. Leon-Garcia, IEEE Network magazine, 2010 (referred to herein as 'Tizghadam'), which is hereby incorporated by reference in its entirety. Moreover, Tizghadam discusses that the network criticality corresponds to network features such as average travel cost, connectivity, sensibility to congestion, network utilization, and sensibility to path changes.

Turning to FIG. 2, FIG. 2 is a simplified schematic diagram of exemplary network descriptors in accordance with some embodiments of the present disclosure. FIG. 2 illustrates a Laplacian matrix 202, a modified Laplacian matrix 204, and eigenvalues 206. In the example of FIG. 2, the matrices and eigenvalues correspond to the first AS 102 of FIG. 1. The rows and columns of each of the Laplacian matrix 202 and the modified Laplacian matrix 204 are labeled with labels that correspond to network elements in the first AS 102.

The values in the Laplacian matrix 202 follow the form discussed above for a Laplacian matrix. Thus, the diagonal values correspond to the degree of each of network elements 104a-h and the off-diagonal values are 1 only if the corresponding network elements are adjacent to one another (e.g., directly connected to one another). For example, the network element 104d is directly connected to each of network elements 104a, 104f, 104h, and 104g (i.e., 4 connections) and, therefore, the degree is 4 (e.g., corresponding to the value −4 in the (diagonal) cell at row 104d and column 104d). Within the first AS, the network element 104h is directly connected to each of network elements 104f and 104d, (i.e., 2 connections) and, therefore, the degree is 2 (e.g., corresponding to the value −2 in the cell at row 104h and column 104h). Although (in FIG. 1) the network element 104h is directly linked to network element 108a in the second AS 106, the Laplacian matrix 202 (in FIG. 2) represents only the connections within the first AS 102 and thus does not explicitly account for links to external AS's. As another example, the network element 104c is not adjacent to network element 104d and, therefore, a value of 0 is provided in the cell at row 104c and column 104d (e.g., based on there being no direct connection between 104c and 104d). The network element 104c is adjacent to network element 104a and, therefore, a value of 1 is provided in the cell at row 104c and column 104a. Since the link is bidirectional between 104c and 104a, the network element 104a is also adjacent to network element 104c and, therefore, a value of 1 is provided in the cell at row 104a and column 104c. In other embodiments, if the link were unidirectional, a value of 0 may be provided in the cell at row 104a and column 104c.

The values in the modified Laplacian matrix 204 are similar to those in the Laplacian 202. A key difference, however, is that the off-diagonal values in the modified Laplacian matrix 204 correspond to the available bandwidth capacity (e.g., free capacity, total capacity minus used capacity, expressed as percentage of total capacity) of the connection between corresponding network elements. Thus, the diagonal values correspond to the degree of each of network elements 104a-h and the off-diagonal cells only contain a value if the corresponding network elements are adjacent to one another (e.g., directly connected to one another). An important feature is that available bandwidth capacity may or may not be symmetric in both directions on a link. For example, the network element 104c is adjacent to network element 104a. The available capacity in the direction from 104c to 104a is 100% available capacity (e.g., 0% used) and, therefore, the value of 1 is provided in the cell at row 104c and column 104a. The available capacity in the direction from 104a to 104c is 91% available capacity (e.g., 9% used) and, therefore, the value of 0.91 is provided in the cell at row 104a and column 104c. The link between 104a and 104c is bidirectional but has different available bandwidth capacity in each direction. In contrast, the link between 104g and 104d are 0.79 in each direction.

The eigenvalues 206 are calculated from the modified Laplacian matrix 204. The eigenvalues 206 give enough information to compare one AS to another, e.g., for making routing decisions, troubleshooting, network planning, and others. The eigenvalues can be "dynamically" updated, by computing such eigenvalues on the actual available bandwidth at particular point in time (or duration of time). For example, the eigenvalues 206 may be periodically calculated (e.g., at regular time intervals, e.g., in units of minutes and/or seconds) and transferred between AS's using new data structures (or implementations of data structures) as disclosed.

Figure 3A:
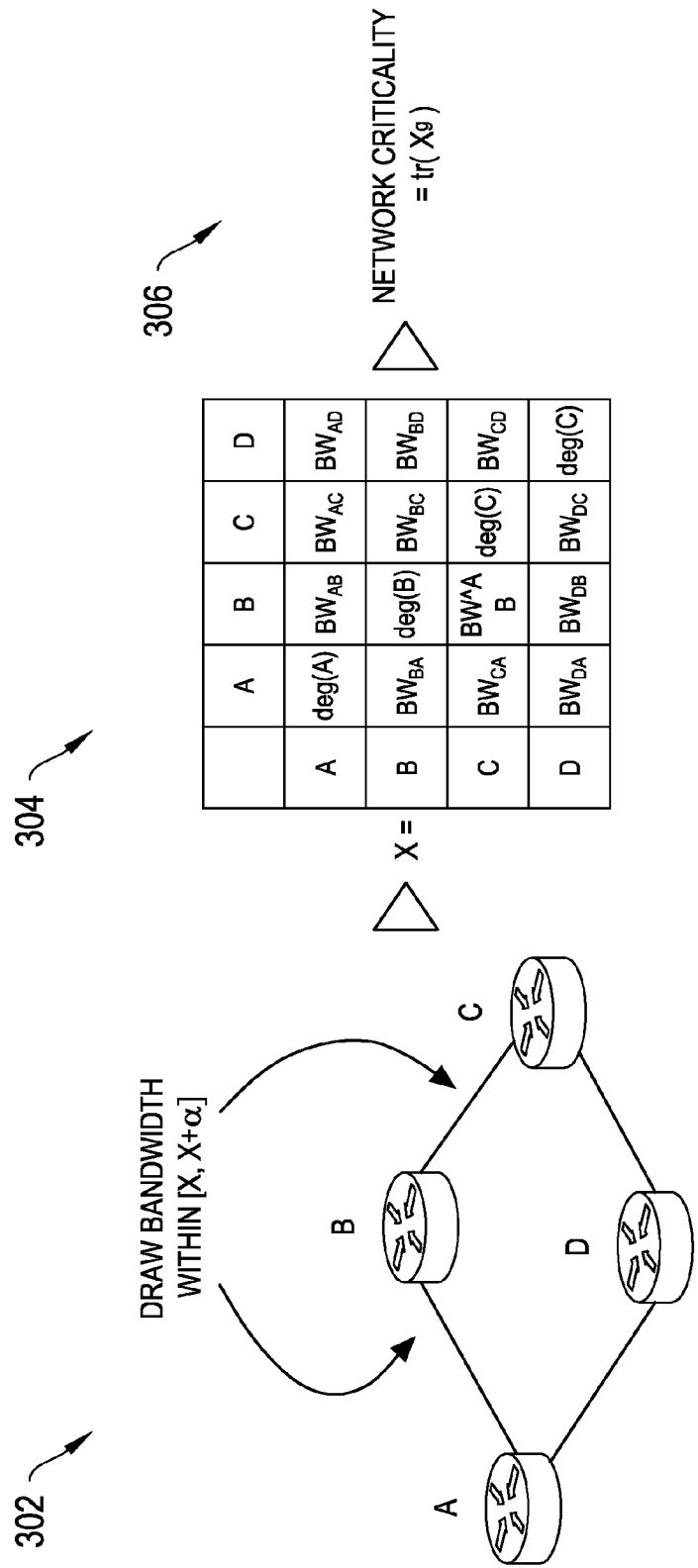
FIG. 3A is a simplified schematic diagram of an exemplary formulation of a network descriptor in accordance with some embodiments of the present disclosure.

Turning to FIG. 3A, FIG. 3A is a simplified schematic diagram of an exemplary formulation of a network descriptor based on network criticality, in accordance with some embodiments of the present disclosure. A network criticality value of a network may be calculated based on a modified Laplacian matrix. The network criticality value corresponds (e.g., is inversely correlated) to bandwidth of a network. The network criticality value increases as bandwidth decreases. As an example of the information carried in the graphical spectrum, five network topologies (numbered 1 through 5) were analyzed. The five network topologies are Barabasi-Albert graph models (the basic form of which are depicted by graph 302), the graph models having increasing values for link bandwidths (e.g., links in topology 2 have more bandwidth than those in topology 1, links in topology 3 have more bandwidth than those in topology 2, etc.). The analysis included measuring the bandwidth of each topology by random picking a source node and a destination node, computing a shortest-path between the source node and the destination node, and determining a bandwidth of a path (a "path bandwidth") between the source to the destination to be equal to a minimum bandwidth selected from the bandwidths of each individual link in the path (e.g., take the minimum link bandwidth as the path bandwidth). This procedure replicates the real world limitations that exist when measuring bandwidth in a (large) network. For each of the five topologies, the path bandwidth values were populated in a modified Laplacian matrix 304 (i.e., five matrices, one for each topology, each matrix following the form of matrix 304). As illustrated by matrix equation 306, a network criticality was computed as being equal to the trace (i.e., a linear algebraic trace) of the generalized inverse (e.g., pseudoinverse) of the modified Laplacian matrix 304 for each topology. Turning to FIG. 3B, FIG. 3B is a table illustrating a summary of network criticality values and measured bandwidth values corresponding to a plurality of network topologies (each of the five topologies). The table shows an inverse proportionality between measured bandwidth and network criticality that is always preserved and, therefore, validates use of the graphical spectrum as a stable property upon which to base decisions regarding various networks (e.g., identifying which of a plurality of networks is a source of a problem within a network flow, deciding which of a plurality of network through which to route a network flow, and the like).

New extensions, presented in the present specification, to exiting network protocols provide a mechanism by which to transmit network descriptors between autonomous systems. The network descriptors may, e.g., be one or more graphical spectrum value, network criticality index, or any other metric (or value) usable to analyze a network and does not expose network topology to an external AS. As will be described in further detail below, the present specification discloses, among other things: a new BGP extension that adds anonymized topological data to a TLV within, e.g., BGP NLRIs; and a new IPFIX extension that adds anonymized topological data to TLVs within, e.g., IPFIX Template Records and Data Records. While the present specification presents such exemplary extensions to BGP and IPFIX, any network description mechanism or protocol may be analogously extended through the usage of TLVs that export anonymized topological data. For example, Resource Reservation Protocol (RSVP) packets may be utilized to transmit anonymized topological data across administrative boundaries between AS's.

In operation, an AS can utilize the new extensions to transmit to a receiving AS (among other things) graphical spectrum values without exposing critical information on the structure (e.g. topology) or configuration (e.g. routing) of the AS to the receiving AS. Advantageously, the receiving AS can use the graphical spectrum values to calculate attributes of the network (e.g., network criticality, travel costs through the network, network utilization, connectivity of the network) even without knowing details of the transmitting AS's network structure and/or configuration. Spectral theory techniques (e.g., applied to graphical spectrum values) provide a way to benchmark AS's through a single set of parameters. Thus, an AS can publish graphical spectrum values as a measure of the health/performance of their network while maintaining privacy of the structure (e.g. topology) or configuration (e.g. routing) of the AS. The structure and configuration is hidden through the computation of the graphical spectrum values (e.g., eigenvalues) while still enabling the recipient of the graphical spectrum values (e.g., a neighbor autonomous system) to compute merit figures on the health and/or performance (e.g., network criticality index) of the transmitting AS. The graphical spectrum also offers a security guarantee that it is impossible to recover (with certainty) the adjacency matrix of the AS based only on the graphical spectrum, this can reassure administrators that they can safely expose this information. As an example, of the security of such an approach, consider an example including an adjacency matrix of size N×N (i.e., the matrix includes $N^2$ numbers). The eigenvalues of the adjacency matrix include no more than N values. In information theory, there is no way to recompute (with certainty) the particular $N^2$ values of the matrix based only on N number values (i.e., the eigenvalues). This is similar to exposing the sum of two numbers (e.g., A+B), where the sum is like the eigenvalue and the numbers are like the number of the adjacency matrix. Even if it is know that the sum of the two number is 7 (e.g., an administrator shares the message indicating that the sum is 7), another AS will not know whether the numbers are A=6,B=1; A=5,B=2; A=4,B=3; . . . etc. Thus, the while other systems may generate a set of possible solutions that produce the sum they will not know, with certainty, which of the possible solutions corresponds to the actual numbers. In the example of matrices, the set of possible solutions is greater than that of the aforementioned example of sums. With such a large set of possible solutions, it is unlikely that the original adjacency matrix cam be reproduced, with certainty, based only on the eigenvalues.

Network descriptors may be encoded as floating point numbers. For example, the numbers may be encoded in a format defined in the Institute of Electrical and Electronics Engineers (IEEE) Standard for Floating-Point Arithmetic (IEEE 754). The current version is IEEE 754-2008, which was published in August 2008. Another commonly used version is the IEEE 754-1985, which was adopted in 1985 and superseded by IEEE 754-2008 in 2008. In some embodiments, the network descriptors are encoded in the IEEE 754 Single precision format (e.g., the "binary32" as identified in IEEE 754-2008, or "single precision" in the IEEE 754-1985). In other embodiments, the network descriptors are encoded in the IEEE 754 Double precision format (e.g., the "binary64" as identified in IEEE 754-2008, or "double precision" in the IEEE 754-1985). One reason for using the Double precision format instead of the Single precision format would be if a precision of more than 0.00000011920928955078125 is needed. The Single precision format has the advantage that it can hold almost twice as many records as the Double precision format can hold. For example, the additional space afforded by the Single precision format may be necessary depending on the size of the network and, therefore, the number of eigenvalues to export (e.g., if the network is large, the number of eigenvalues may exceed the capacity of an Double precision format). Subsequent to encoding the network descriptors in a floating-point format, such network descriptors may be further encoded into a network protocol (e.g., BGP, IPFIX, RSVP, and the like).

BGP-LS enables the exchange of "actual" topology information (i.e., the topology is not anonymized). In some cases, such exchange of actual topology data is impermissible due to privacy concerns (e.g., as is often the case between AS's). The present disclosure, advantageously, provides anonymized topology data (in contrast to actual topology data) and an extension to BGP-LS to exchange such anonymized topology data between systems.

A new EGP extension, in particular an extension to information included in BGP-LS Network Layer Reachability Information (NLRI), presented in the present specification, addresses problem in the current state of the art by providing anonymized network descriptors between different AS's. FIGS. 4A, 4B, 4C, 4D and 5 illustrate an exemplary extension to an EGP in accordance with some embodiments of the present disclosure. In particular, the exemplary extension is a new BGP-LS extension that adds anonymized topological data to a TLV within BGP-LS NLRIs. Turning to FIG. 4A, FIG. 4A illustrates a Link-State TLV format 402 and a table of NLRI types 406. The Link-State TLV format 402 is the format as defined in the BGP-LS draft (e.g., BGP-LS section 3.2). The Link-State NLRI format 402 includes a field 408, which is a 16-bit field titled "NLRI Type"; a field 410, which is a 16-bit field titled "Total NLRI Length"; and a variable length field titled "Link-State NLRI".

In operation, each of the fields 408, 410, and 412 is encoded with specific values. The field 408 is encoded with a numerical value corresponding to one of the types in table 406. The field 410 is encoded with a 16-bit value that identifies a length of the data encoded in the field 412, where such length is measured is octets (e.g., 8 units, 8 bits which is equal to 1 byte). The field 410 contains only the cumulative length of the remainder of the NLRI, i.e., including neither the length of the field 408 nor the length of the field 410. The field 412 is encoded with a Link-State NLRI that corresponds to the type identified in the field 408.

The table 406 includes an extension, disclosed in the present specification, which adds a new NLRI type to the BGP-LS protocol. Each of types 414, 416, 418, and 420 is defined in the BGP-LS protocol. Type 414 has an identifier "1" and corresponds to a "Node NLRI". A Node NLRI may represent, e.g., a router, an autonomous system, an OSPF area, a BGP speaker, and the like. Type 416 has an identifier "2" and corresponds to a "Link NLRI". A Link NLRI may represent logical and/or physical link between two nodes. Type 418 has an identifier "3" and corresponds to an "IPv4 Topology Prefix NLRI". Type 420 has an identifier "4" and corresponds to an "IPv6 Topology Prefix NLRI". Types 418 and 420 explicitly identify nodes and prefixes associated with such nodes. Thus, in operation, when NLRI's of type 418 and 420 are transmitted between AS's, details (e.g., node and corresponding prefixes, connectivity, etc.) of the network within an AS are explicitly provided to an external AS. Many AS administrators would prefer to not share such details (and other details) to external AS's. However, in many cases, such details must be exposed in order to enable network analysis tools to identify issues in network flows that traverse administrative boundaries between AS's. Type 422 is not defined in the BGP-LS protocol (or any other protocol). Indeed, type 422 is a new extension, to the BGP-LS protocol, disclosed in the present specification. The type 412 has an identifier "5" and corresponds to an "Anonymized Topology NLRI". It is noted that the identifier "5" is used here only as an example. However, any value of identifier may be used as long as it is unique from other Link-State NLRI types defined in the BGP and/or BGP-LS protocol. The Anonymized Topology NLRI may not explicitly identify nodes. Instead, an Anonymized Topology NLRI identifies one or more values that correspond to network topology but keep the details of such topology private. The one or more values enable a receiving entity to calculate attributes of the network (e.g., using spectral theory techniques). For example, an Anonymized Topology NLRI may contain one or more eigenvalues. Further description of such an example is provided below with respect to FIGS. 4B, 4C, 4D, and 5.

Turning to FIG. 4B, FIG. 4B illustrates an example of a new Anonymized Topology NLRI format 424, according to some embodiments of the present disclosure. The NLRI format 424 is new type of Link-State NLRI. In some examples, one or more instances of the NLRI format 424 are encoded into the field 412 of an instance of the Link-State TLV format 402. The Anonymized Topology NLRI format 424 includes a field 426, which is an 8-bit field titled "Protocol-ID"; a field 428, which is a 64-bit field titled "Identifier" (e.g., identifies a routing protocol); and a field 430, which is a variable length field titled "Anonymized Topology Descriptors". In some examples, the Anonymized Topology NLRI format 424 further includes a field 432, which is a variable length field titled "Prefix Descriptors" (i.e., in addition to fields 426, 428, and 430). The Prefix Descriptors can be used to further identify a network prefix corresponding to each Anonymized Topology NLRI. Such a prefix can be used in cases where, e.g., network descriptors are calculated for a subnet of an AS (i.e., where the subnet is identified by the network prefix).

Each Anonymized Topology Descriptor (i.e., in the field 430) can include an instance of the anonymized topology data, as disclosed herein. In particular, an Anonymized Topology Descriptor consists of one or more TLVs. Each of the one or more TLVs has a value field (e.g., encoded in the value portion of the TLV) that matches a TLV Code Point from table 434 of Anonymized Topology Descriptor Sub-TLVs of FIG. 4C.

Turning to FIG. 4C, FIG. 4C illustrates an example of a new Sub-TLV for an Anonymized Topology Descriptor. In general, the table 434 defines the types of TLVs that are valid for encoding within the field 430 of the Anonymized Topology NLRI format 424.

The table 434 includes a column 436 titled "TLV Code Point"; a column 438 titled "Description"; and a column 440 titled "IS-IS TLV/Sub-TLV". Each row in the table 434 defines a type of TLVs that is valid for encoding within the field 430 of the Anonymized Topology NLRI format 424 (i.e., each of the one or more TLVs encoded in 430 must have a type that matches a TLV Code Point in column 436). The column 436 defines a numerical identifier for the Sub-TLV for use in BGP-LS (e.g., numerical identifier value of 1200, or any other available value of Code Point). The column 438 comprises text that semantically describes the value that would be encoded in a TLV having the type as identified in the corresponding row of column 436. The column 440 defines a numerical identifier for the TLV for use in IS-IS. Because the Anonymized Topology Descriptor Sub-TLVs are newly introduced in the present disclosure, the TLV Code Point values and IS-IS TLV/Sub-TLV values are listed as "TBD" since the Internet Assigned Numbers Authority (IANA) assigns such values. However, any value of TLV Code Point values and IS-IS TLV/Sub-TLV values may be used as long as they are unique from other TLV Code Point values and IS-IS TLV/Sub-TLV values used in BGP and/or in BGP-LS.

As described above, an Anonymized Topology Descriptor is a TLV (e.g., a "ATD-TLV"). The Type field of the ATD-TLV must match a TLV Code Point in table 434 (FIG. 4C. The Length field of the ATD-TLV identifies the length of the Value portion of the ATD-TLV. The Value field of the ATD-TLV is encoded with one or more values (e.g., an eigenvalue TLV). Turning to FIG. 4D, FIG. 4D illustrates a new eigenvalue TLV 442, as disclosed in the present specification. Each of the one or more values encoded in the Value field of the ATD-TLV may be an eigenvalue TLV. As described above, network descriptors may be encoded as floating-point numbers. Consequently, each eigenvalue may be encoded as a floating-point number within BGP-LS. BGP (which is extended by BGP-LS) defines value types of "float32" and "float64", which respectively correspond to IEEE binary32 and IEEE binary64 as specified in IEEE 754-2008. The Type field 444 may be assigned a type equal to, e.g., float32 or float64. The Value field 446 identifies the length of the Eigenvalue field 448. The exemplary IEEE encodings described for network descriptors can be directly encoded into Eigenvalue field 448 since the IEEE encodings directly match the float encodings (e.g., float32 and/or float64) in BGP.

Figure 5:
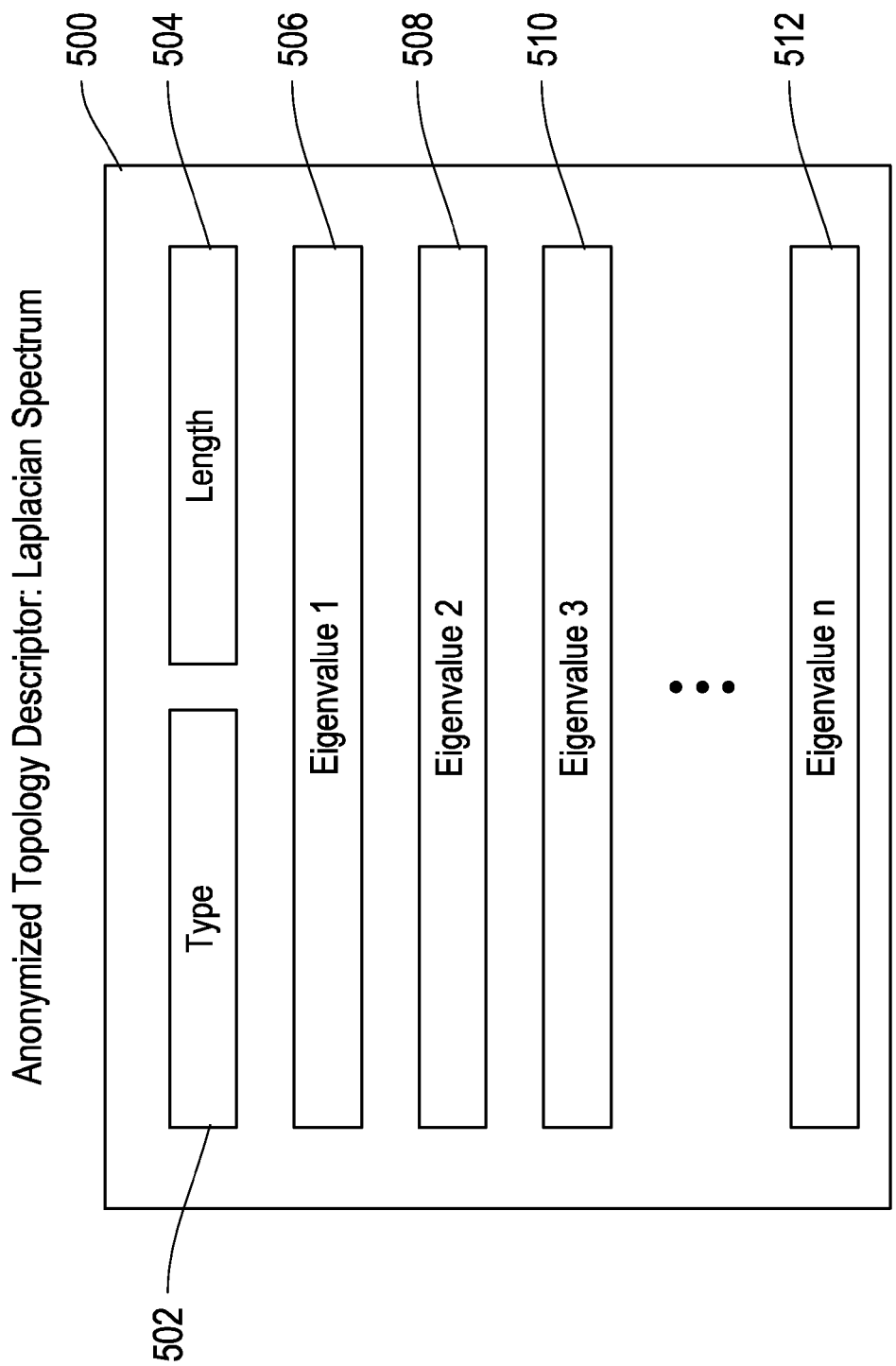

In operation, each NLRI comprises a set of nested TLVs. The Link-State NLRI field 412 of Link-State TLV 402 (FIG. 4A) is encoded with one or more NLRIs (e.g., as defined by Anonymized Topology NLRI format 424 of FIG. 4B). In turn, each instance of an Anonymized Topology NLRI comprises, within the Anonymized Topology Descriptor field 430, one or more TLVs (with Types defined by tabled 434 of FIG. 4C). In turn, each of the one or more TLVs comprises one or more Eigenvalue TLVs. Turning to FIG. 5, FIG. 5 illustrates an exemplary Anonymized Topology Descriptor 500. The Anonymized Topology Descriptor 500 has a Type field 502, which in this case is encoded with a TLV Code Point value that corresponds to a "Laplacian Spectrum". The Value field 504 encodes the cumulative length of Eigenvalues 1-n (i.e., 506, 508, 510, and 512). Each of the Eigenvalues 506, 508, 510, and 512 is an instance of the Eigenvalue TLV 442 of FIG. 4D. The Anonymized Topology Descriptor 500 may be encoded in the Anonymized Topology Descriptor field 430 of a NLRI 424 of FIG. 4B.

The above example illustrates the use of a new NLRI format to introduce Anonymized Topology data into BGP. The use of such a new NLRI format, advantageously, provides an independent structure for the exchange of Anonymized Topology data. However, the present disclosure is not limited to such an implementation. As an alternative, the new sub-type for "Laplacian Spectrum" (e.g., as defined in FIGS. 4C and 4D) may be used as a new extension to the existing NLRI Types for "IPv4 Topology Prefix NLRI" (Type "3") and "IPv6 Topology Prefix NLRI" (Type "4). In such an example, advantageously, reuses existing format for Type 3 and 4, which are already used to advertise the network to which the Anonymized Topology data would correspond. This would enable an AS to advertise graphical spectrum information for different subnets within the AS (e.g., using Prefix Descriptors as defined in BGP-LS section 3.2.3.). It is noted that the Prefix Descriptors can also be utilized in combination with the new NLRI format (e.g., encoded with the Prefix Descriptors field 432 of FIG. 4B).

Turning to FIG. 6A, FIG. 6A illustrates an exemplary IPFIX message 600. In general, an IPFIX message comprises a message header and zero or more sets. The Sets can be Data Sets, Template Sets, or Options Sets, each of which is defined in RFC 7011 section 3. Each Set contains one or more Records (e.g., Template Sets contain Template Records, Data Sets contain Data Records). In turn, each Record can contain one or more fields. The fields can be any of the IPFIX Data Types such as a "string" (i.e., a string literal), an octetArray (e.g., an Array of Bytes), a "float32" (i.e., IEEE binary32), or "float64" (i.e., IEEE binary64). At a high level, each Template Sets defines a structure that is followed by Data Records in a corresponding Data Set. In other words, the Data Records follow the template defined by the Template Sets. In the example, of FIG. 6A, the IPFIX message 600 comprises a Header 602, followed by three Sets: a Template Set 604, and two Data Sets 608 and 612. The Template Set 604 contains a single Template Record 606. The Data Set 608 contains Data Records 610*a* and 610*b*. The Data Set 612 contains Data Records 614*a*, 614*b*, and 614*c*. In this example, the Template Set 604 defines the format of each Data Record in Data Set 608 (i.e., Data Records 610*a-b*). A Data Set includes an identifier of a Template Set; this identifier identifies the Template Set that defines the form of each Data Record in the Data Set.

Turning to FIG. 6B, FIG. 6B illustrates exemplary fields and values that may be encoded in the IPFIX message 604, according to some embodiments of the present disclosure. The field 616 is titled "Template ID" and is encoded with a numerical identifier for the Template Set. In this example, the template ID is "258". In such an example, any Data Record that follows the format defined by this Template Set 604 must reference the ID "258", as discussed further below with respect to Data Set 608. The format of this Template Set 604 is defined within the Template Record 606. In this example, the Template Record 606 includes fields 606*a* and 606*b*. Each field contains two sub-fields. The sub-fields identify the type and length of a corresponding Data Record. In effect, the Template Record is analogous to the Type and Length portion of a TLV while a corresponding Data Record contains the Value portion of the TLV. This allows the Type and Length portions to be transmitting only when the template is updated (e.g., which may be infrequently), and the Value field can be transmitted when the value is updated (e.g., which may be often). Transmitting the Value alone consumes fewer network resources (e.g., bandwidth) than transmitting the TLV all together. The field 606*a* is an eigenvalue field. The eigenvalue field corresponds to an "ElementID" of a new IPFIX Information Element, defined in the present disclosure. The type is defined by a numerical identifier, which is listed as "TBD" since the IANA assigns such values (and have not been assigned since the new IPFIX Information Element is newly disclosed in the present disclosure). However, any value of the numerical identifier may be used, as long it is unique from other numerical identifiers for Information Elements used in IPFIX. The length sub-field identifies that the data has a length of 4. The length is measured in multiples of an octet (e.g., 8 bits which is 1 Bytes). Thus, the data are 8×4 bits, 32 bits, in length. In this case, the length corresponds to the length of the float32. However, eigenvalues (and/or or any other network description value) may be encoded in any value type with sufficient capacity to carry its range of values (e.g., float32, float64, sting, arrays, and the like). The field 606*b* is a "SourceIPv4Prefix" field 606*b*. The type is identified by a numerical identifier "44", which corresponds to an "ElementID" of an Information Element that is defined by the IANA publication "IP Flow Information Export (IPFIX) Entities". The "SourceIPv4Prefix" Information Element is defined by IANA as an IPv4 source address prefix. The value is an IPv4 prefix of, e.g., a source node of a network flow. In this example, the prefix identifiers the prefix that is associated with the eigenvalue encoded in the field 606*a*. The field 606*b* may be included in some examples but excluded from others. For example, if the eigenvalues are calculated over all prefixes of a network, then the prefix field 606*b* may be excluded (e.g., since the eigenvalues apply to all prefixes). However, if the eigenvalues are calculated over only a single prefix of a network (e.g., a subnet), then the prefix field 606*b* may be included (e.g., since the eigenvalues apply to the single prefix).

Figure 6C:
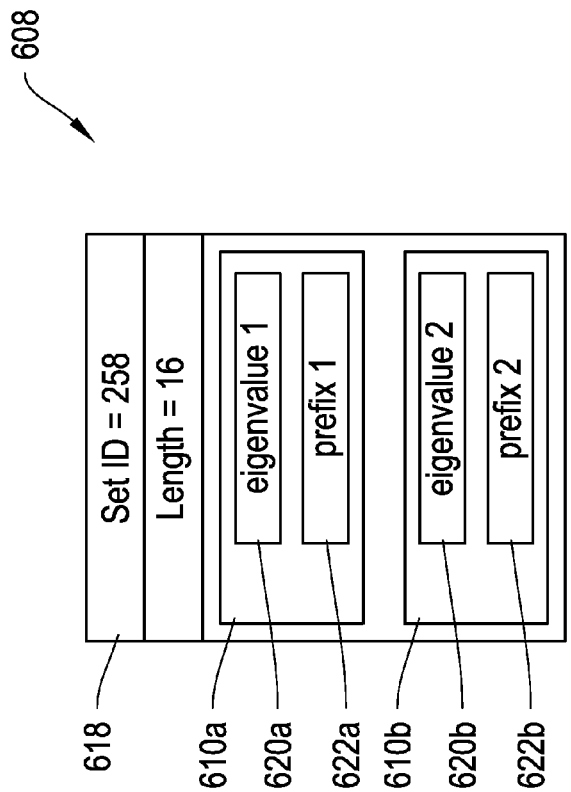

Turning to FIG. 6C, FIG. 6C illustrates exemplary fields and values that may be encoded in the Data Record 608, according to some embodiments of the present disclosure. In this example, the Data Record 608 follows the form defined by the Template Set 604. Thus, the Set ID field of the Data Record 608 (FIG. 6C) contains the value "258", which matches the value "258" in the Template ID field 616 of Template Set 604 (FIG. 6B). An association between a Data Set (and the Data Records stored therein) and the Template Set is defined based on the Set ID matching the Template ID defines. As described with respect to FIG. 6A, the Data Record 608 includes Data Records 610*a* and 610*b*. FIG. 6C illustrates exemplary contents of such Data Records 610*a* and 610*b*. Each of Data Records 610*a* and 610*b* includes an eigenvalue and a prefix as defined by the fields 606*a* and 606*b*, respectively, of Template Set 604. Data Record 610*a* includes values 620*a* and 622*a*. The value 620*a* is a first eigenvalue ("eigenvalue 1"), which corresponds to the format (e.g., type and length) defined by the field 606*a*. The value 620*b* is a first prefix ("prefix 1"), which corresponds to the format (e.g., type and length) defined by the field 606*b*. In this example, the first eigenvalue was calculated for network elements included in the subnet identified by the first prefix. Data Record 610*b* includes values 620*b* and 622*b*. The values 620*b* and 622*b* are further instances of an eigenvalue (i.e., a second eigenvalue ("eigenvalue 2")) and a prefix (i.e., a second prefix ("prefix 2")), similar to those described for values 620*a* and 622*a*.

Figure 6D:
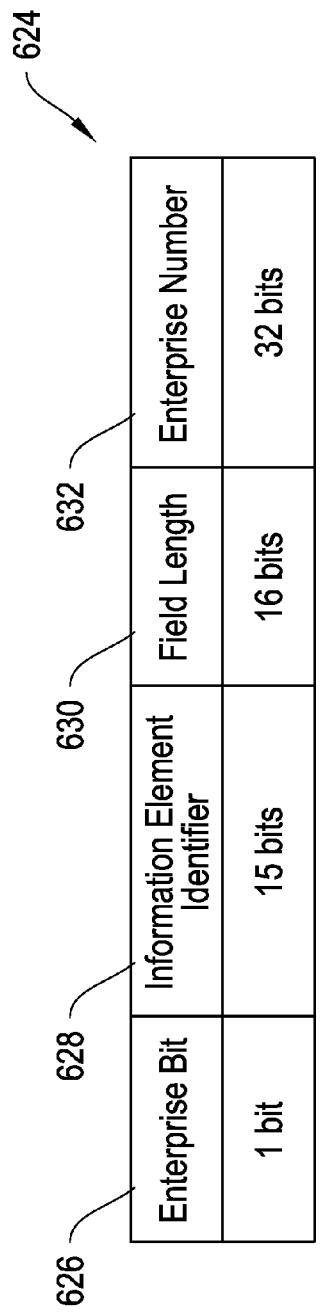

Turning to FIG. 6D, FIG. 6D illustrates a format of an IPFIX Information Element (IE) 624. The form of the IPFIX Information Element 624 follows that described in the IPFIX protocol. In particular, the IPFIX IE 624 includes a field 624, which is a 1-bit field titled "Enterprise Bit"; a field 628, which is a 15-bit field titled "Information Element Identifier"; and a field 628, which is a 32-bit field titled "Enterprise Number". In operation, an IPFIX IE may be either a propriety type or an IANA defined type. The Enterprise bit is encoded with a one ("1") to indicate that the Information Element is a propriety type or is encoded with a zero ("0") to indicate that the Information Element is a standard, IANA defined, Information Element. The Enterprise Number identifies an enterprise (e.g., a company or institution) associated with a propriety type. When the Enterprise bit is equal to zero, the Enterprise Number is ignored. When the Enterprise bit is equal to one, the Enterprise Number is defined. The IANA also maintains a registry of Enterprise Numbers for various enterprises. The Information Element Identifier is an identifier for an Information Element and, in operation, is reference in the "ElementID" corresponds to the type values identified in a Template Record (e.g., the value "44" in the 606*b* and the "TBD" value in 606*a* in FIG. 6B).

A new IPFIX Information Element type corresponding to one or more eigenvalues, presented herein, may be implemented as an IANA standard IE or as a proprietary type. In the example implementation of an IANA standard, the new type may introduce by way of a new IE for eigenvalues (e.g., encoded as a float32, float 64, string, octetArray, or any other appropriate data type) and receiving assignment of an IPFIX IE ElementID from IANA. Alternatively, in the example implementation of proprietary format, an Enterprise Number may be assigned by IANA to a corresponding Enterprise. The IPFIX IE ElementID may then be defined by the enterprise. In such an implementation, the Enterprise Number is combined with the proprietary ElementID to define a globally unique ID for identification of the new IPFIX IE.

In the example of FIGS. 6A-6C, eigenvalues were encoded as 32-bit floating-point numbers (i.e., float32). These examples discuss exemplary extensions to RFC 7011. Advantageously, the format of the eigenvalues is transparent to the IPFIX protocol. Moreover, the RFC 7011 is widely implemented and deployed, allowing the extensions above to be simply applied to any system that is already implementing RFC 7011. In addition, to the IPFIX IE for eigenvalues, a second IPFIX IE for storing lists of one or more IPFIX IE for eigenvalues may be added as an new extension to the IPFIX protocol. Each list may identify a full graphical spectrum of a network. While the example of FIGS. 6A-6C use 32-bit floating-point numbers, in other implementations, eigenvalues (or other network descriptors) may be encoded in other value types. As an alternative, a Template Set may specify use of an octetArray (or string) to encode the eigenvalues (e.g., using the same encoding was described for TLV 442 in FIG. 4D). When encoded as an octetArray, the value contained therein is opaque to the IPFIX protocol. The value is "opaque" in the sense that the IPFIX protocol would not contain the semantics of the octets (i.e., Bytes) stated in the Array. Instead, the values would merely be Bytes of data (and the interpretation of the values would not be defined by the IPFIX protocol). An advantage of this approach is that a single TLV format may be used for both IPFIX and BGP. Thus, one TLV format can be exported through multiple protocols based on the deployment scenario. The eigenvalues could be encoding into the TLV and directly exported to each of a BGP-LS NLRI and an IPFIX message. However, since the values are opaque to IPFIX, the values may not be directly usable by the IPFIX format. Instead, further processing of the Bytes would be needed to enable, e.g., comparing the eigenvalues to a threshold value, calculating a network criticality from the eigenvalues, filtering, thresholding, and the like. As another alternative, a Template Set may specify use of structured lists or list of lists (as defined in RFC 6313). In such an implementation, a single IPFIX IE may contain a single eigenvalue, e.g., of type float32. The lists can contain one or more of the IPFIX IEs for eigenvalues. An advantage of this approach is that format of each eigenvalue (and the semantics of the lists) is transparent to IPFIX protocol.

Figures 7, 8:
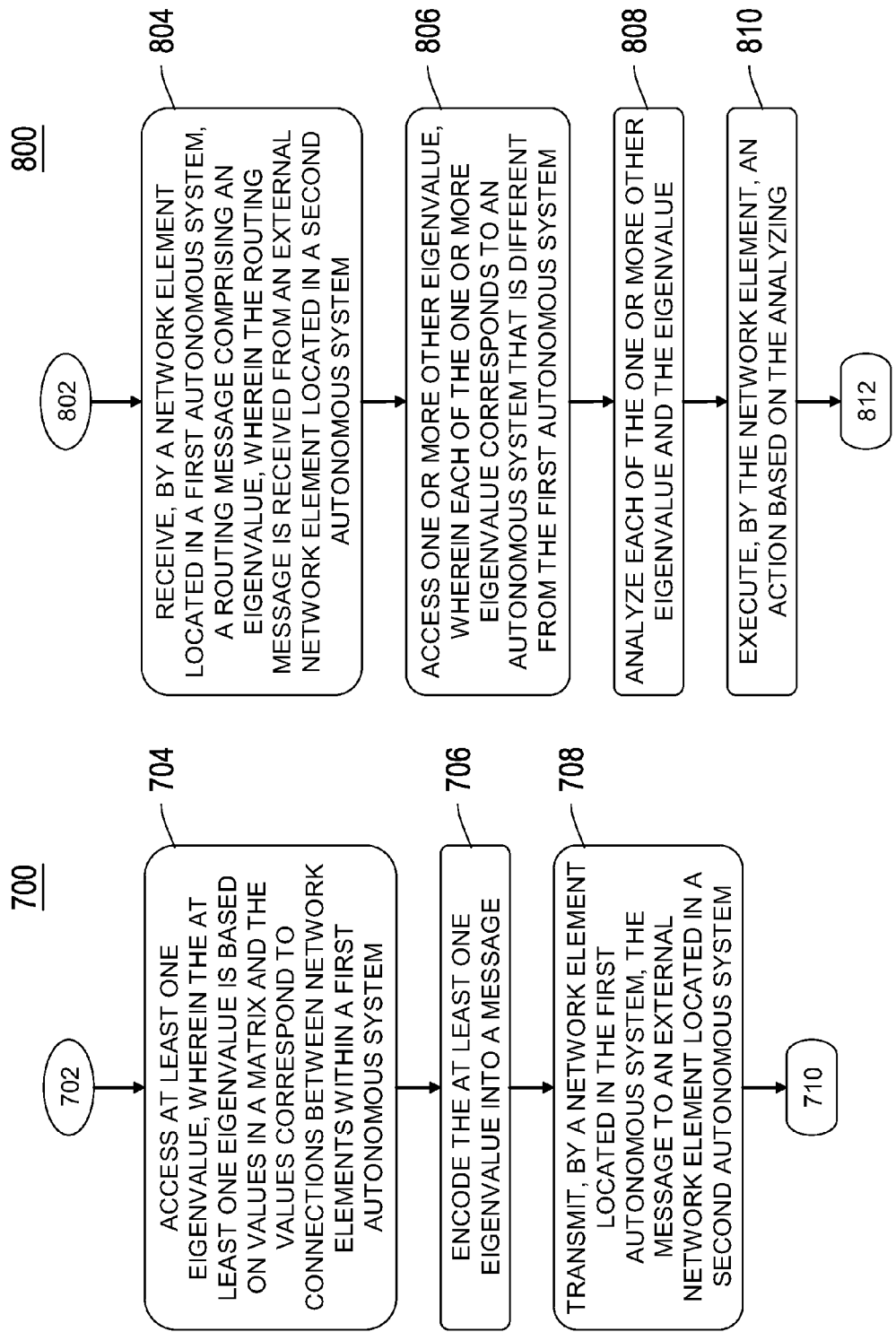
FIGS. 7 and 8 illustrate exemplary logic in accordance with some embodiments of the present disclosure.

Turning to FIG. 7, FIG. 7 illustrates exemplary logic or a method (logic 700) usable for transmitting a network descriptor from a first autonomous system to a second autonomous system, according to some embodiments of the present disclosure. Logic 700 may be implemented by one or more network component in an autonomous system (e.g., by a network controller node operable to control other network elements in the AS such as an SDN controller, an edge router, a core router, a BGP edge router, and the like). In some examples, a SDN controller may utilize logic 700 to compute eigenvalues and transmit them to other systems (e.g., using an inter-SDN controller protocol or through edge routers using BGP/IPFIX). In other examples, an IPFIX collector (e.g., located the AS) may utilize logic 700 to collect data including a global view of IGP(s) and transmit the data to edge routers. Logic 700 comprises start point 702; procedure 704 comprising accessing at least one eigenvalue, wherein the at least one eigenvalue is based on values in a matrix and the values correspond to connections between network elements within a first autonomous system; procedure 706 comprising encoding the at least one eigenvalue into a message; procedure 708 comprising transmitting, by a network element located in the first autonomous system, the message to an external network element located in a second autonomous system; and end point 710.

Start point 702 may coincide with a start or end point of other logic, routines, and/or applications. In addition, at start point 702, data (e.g., objects, values, variables, etc.) may be initialized, retrieved, or accessed for use in logic 700. The logic 700 advances from start point 702 to procedure 704 (e.g., in some cases, executing intermediate procedures between 702 and 704).

At procedure 704, at least one eigenvalue is accessed. The at least one eigenvalue is based on values in a matrix. The values in the matrix correspond to connections between network elements within the first autonomous system. The matrix may be a Laplacian matrix (similar to those described with respect to FIGS. 2 and 3A), which can include, e.g., bandwidth values, percent values, and the like corresponding to links between network elements within the first autonomous system. In some cases, accessing the at least cone eigenvalue may include retrieving previously calculated (e.g., calculated by a third party or by another network element). In this case, the values can be retrieved, by a network element, from memory accessible to the elements. In other example, the accessing the at least one eigenvalue comprises calculating the at least one eigenvalue. For example, the matrix may be retrieved from a memory (e.g., wherein the matrix comprises the plurality of values corresponding to the connections between the network elements within the first autonomous system). The network element may execute code (or cause such code to be executed) including instructions for calculating eigenvalues of the matrix using the plurality of values in the matrix. The at least one eigenvalue from the calculated eigenvalues. At procedure 706, the at least one eigenvalue is encoded into a message. At procedure 708, a network element, located in the first autonomous system, transmits the message to an external network element located in a second autonomous system.

End point 710 may coincide with a start/end point of other logic, routines, and/or applications (e.g., start point 802, or other logic). Logic 700 may be implemented in any component or combination of components of systems 100 (FIG. 1), 900 (FIG. 9), 1000 (FIG. 10), 1100 (FIG. 11) and/or 1300 (FIG. 13). For example, a processor operatively coupled to (or within) an edge router in any of AS's 102, 106, and/or 110.

Turning to FIG. 8, FIG. 8 illustrates exemplary logic or a method (logic 800) usable for receiving, by a network element in a first autonomous system, a network descriptor from a second autonomous system, according to some embodiments of the present disclosure. Logic 800 may be implemented by one or more network component in an autonomous system (e.g., by a network controller node operable to control other network elements in the AS such as an SDN controller, an edge router, a core router, a BGP edge router, and the like). In some examples, a SDN controller may utilize logic 700 to compute eigenvalues and transmit them to other systems (e.g., using an inter-SDN controller protocol or through edge routers using BGP/IPFIX). In other examples, an IPFIX collector (e.g., located the AS) may utilize logic 700 to collect data including a global view of IGP(s) and transmit the data to edge routers. Logic 800 comprises start point 802; procedure 804 comprising receiving, by a network element located in a first autonomous system, a routing message comprising an eigenvalue, wherein the routing message is received from an external network element located in a second autonomous system; procedure 806 comprising accessing one or more other eigenvalue, wherein each of the one or more other eigenvalue corresponding to an autonomous system that is different from the first autonomous system; procedure 808 comprising analyzing each of the one or more other eigenvalue and the eigenvalue; procedure 810 comprising executing, by the network element, an action based on the analyzing; and end point 812.

Start point 802 may coincide with a start or end point of other logic, routines, and/or applications. In addition, at start point 802, data (e.g., objects, values, variables, etc.) may be initialized, retrieved, or accessed for use in logic 800. The logic 800 advances from start point 802 to procedure 804 (e.g., in some cases, executing intermediate procedures between 802 and 804).

At procedure 804, a network element, located in a first autonomous system, receives a routing message comprising an eigenvalue. The network element receives the routing message from an external network element located in a second autonomous system. The message may be encoded using any of the new extensions disclosed in the present disclosure. For example, the message may be a BGP-LS message (e.g., a BGP update message) comprising an Anonymized Topology NLRI as disclosed herein with respect to FIGS. 4A-D and 5. In other examples, the message may be an IPFIX message comprising one or more IPFIX IEs as disclosed herein with respect to FIGS. 6A-6D. In further examples, the message may be an RSVP message, or may be encoded in any other protocol operable to transmit messages between AS's.

At procedure 806, one or more other eigenvalue is accesses. Each of the one or more other eigenvalue corresponds to an autonomous system that is different from the first autonomous system. At procedure 808, each of the one or more other eigenvalue and the eigenvalue are analyzed. The analysis may include, e.g., comparing the one or more other eigenvalue to the eigenvalue, calculating other attributes (e.g., congestion, connectivity, travel cost, and Network utilization) of the corresponding AS's and the second AS based on the one or more other eigenvalue and the eigenvalue, respectively; comparing the other values; determining which AS of a plurality of AS's (e.g., the plurality include at least the corresponding AS's and the second AS) over which to route a network flow based, at least in part, on the one or more other eigenvalue and the eigenvalue. Some attributes such as congestion, connectivity, travel cost, and Network utilization may be calculated, using the eigenvalues, in a manner as discussed in Tizghadam.

At procedure 810, the network element executes an action based on the analyzing. For example, the network may route a network flow over one of a plurality of other AS's based on the analysis. In other examples, the network element may determine which of the plurality of AS's is a source of a network problem in a network flow. If the network element is located in the same AS determined to the be the problem, the network element may further execute a packet tracing function within the AS to further identify which of a plurality of network elements in the AS is the source of the problem (and/or is contributing to the problem).

End point 812 may coincide with a start/end point of other logic, routines, and/or applications (e.g., start point 702, or other logic). Logic 800 may be implemented in any component or combination of components of systems 100 (FIG. 1), 900 (FIG. 9), 1000 (FIG. 10), 1100 (FIG. 11) and/or 1300 (FIG. 13). For example, a processor operatively coupled to (or within) an edge router in any of AS's 102, 106, and/or 110.

Figure 9:
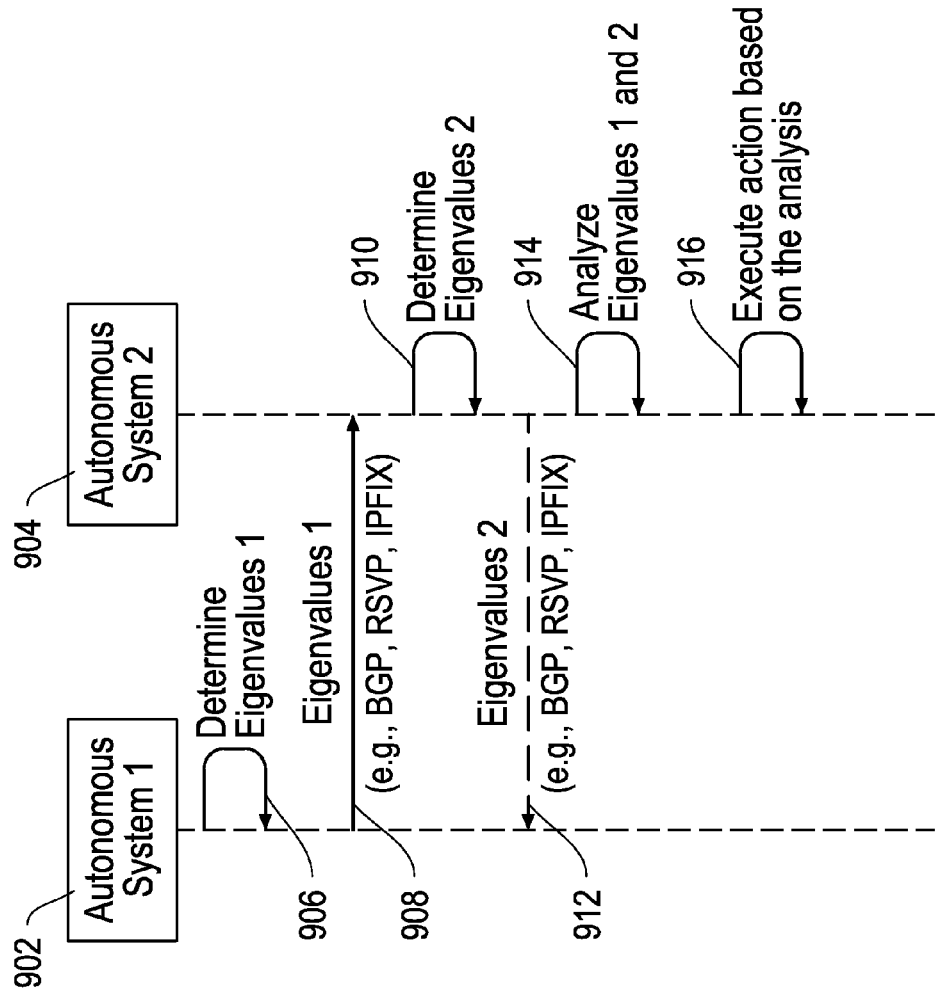
FIGS. 9, 10, and 11 are simplified messaging diagrams in accordance with some embodiments of the present disclosure.

Turning to FIG. 9, FIG. 9 is a simplified diagram that illustrates exemplary system (system 900) and signals generated by a first autonomous system (AS) 902 and a second autonomous system (AS) 904 within the system, according to some embodiments of the present disclosure. While the details of each of the first AS 902 and the second AS 904 are not illustrated in FIG. 9, each may include components similar to any one or more of the first AS 102, the second AS 106, and the third AS 110 of FIG. 1. Moreover, each of the first AS 902 and the second AS 904 may execute the logic 700 and/or the logic 800 for transferring network descriptors between one another. At 906, the first AS 902 determines "Eigenvalues 1", which are a first set of eigenvalues. Such a determination may be made by retrieving the eigenvalues from a memory or by directly calculating the first set of eigenvalues based on a matrix corresponding to at least a portion of a network within the first AS 902 (e.g., by executing instructions corresponding to procedure 704 of logic 700). The first set of eigenvalues (or any portion thereof) may be encoded within a message using a protocol (e.g., BGP, RSVP, IPFIX). For example, the message may be a BGP update message, an RSVP message, an IPFIX message, or message encoded in any other protocol usable for transmitting network data (e.g., a Layer 3 protocol). At 908, the first AS 902 transmits the first set of eigenvalues (e.g., encoded in the message using, e.g., BGP, RSVP, IPFIX) to the second AS 904. The second AS 904 receives the first set of eigenvalues from the first AS 902. At 910, the second AS 904 determines a second set of eigenvalues "Eigenvalues 2" for a least a portion of a network within the second AS in a manner similar to that described for 906. In some examples, at 912, the second AS 904 transmits the eigenvalues to the first AS 902 in a manner similar to that described for 908. At 914, the second AS 904 analyzes both the first set of eigenvalues and the second set of eigenvalues. The analysis may be executed, e.g., as described with respect to procedure 808 in logic 800. At 916, the second AS 904 executes an action based on the analysis. The execution of the action may be executed, e.g., as described with respect to procedure 810 in logic 800.

Figure 10:
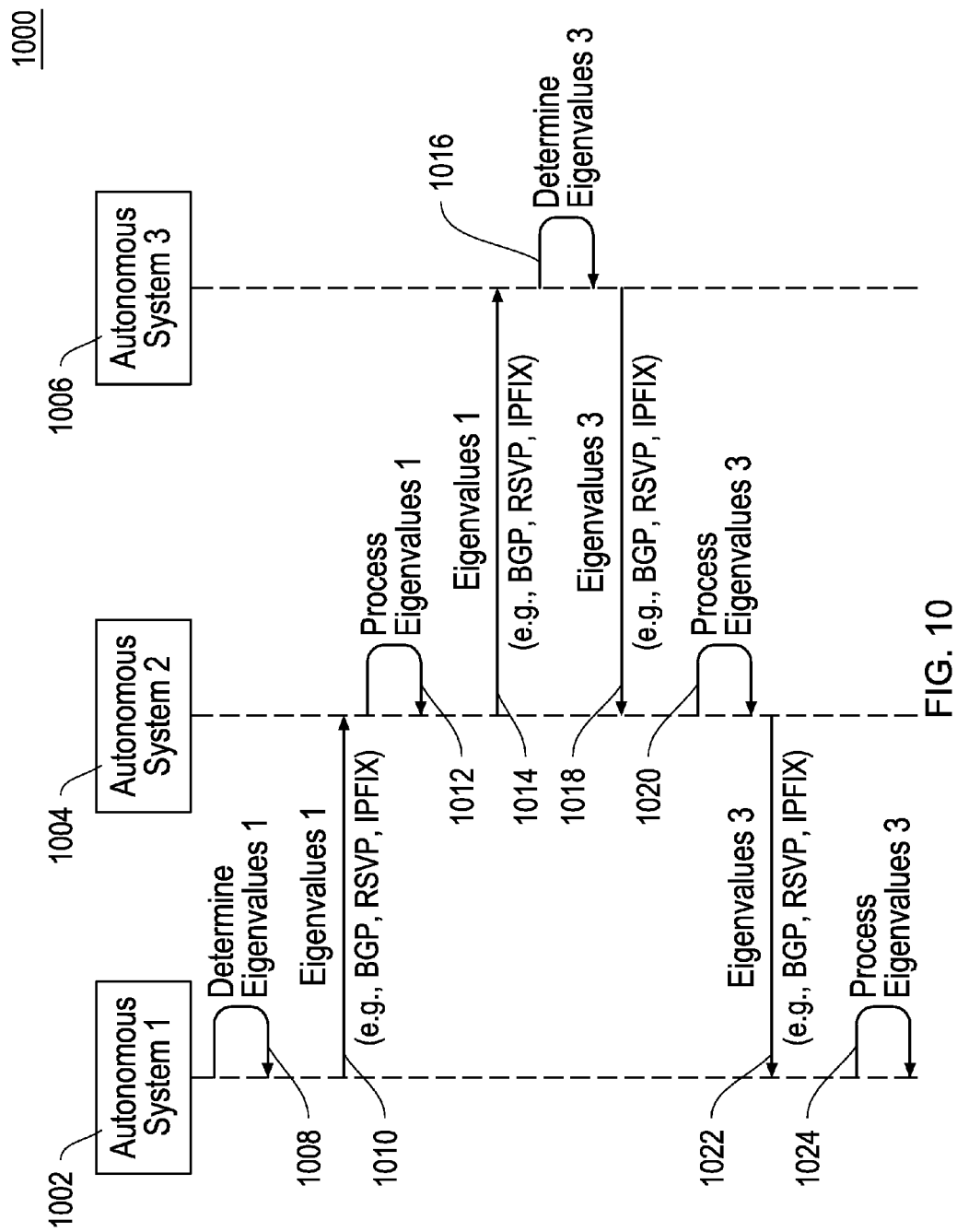

Turning to FIG. 10, FIG. 10 illustrates a system 1000 including a plurality of autonomous systems (i.e., a first AS 1002, a second AS 1004, and a third AS 1006). This example, illustrates an incremental deployment of new extensions disclosed herein. It is recognized that not all AS's may implement such new extensions to transmit network descriptions. In the example, of FIG. 10, only the first AS 1002 and third AS 1006 transmit their network descriptors. In contrast, the second AS 1004 does not transmit network descriptors corresponding to the send AS. Instead, the second AS may receive network descriptors from other AS's and/or may then relay those descriptors on to still further AS's. For example, the first AS 1002 may determine the network descriptors at 1008 and transmit the network descriptors to the second AS at 1010. The second AS 1004 receives the network descriptors from the first AS 1002. At 1012, the second AS 1004 may process the network descriptors received from the first AS 1002. The processing may be to prepare the network descriptors for relay to other neighboring AS's (e.g., to the third AS 1006 and/or to any other AS other than the first AS 1002). In addition, the processing may be to analyze the eigenvalues along with other eigenvalues, which may have been received from other AS's (e.g., as described with respect to procedure 808 in logic 800) or have been calculated for the second AS 1004. Thus, although the second AS 1004 does not export network descriptors (or transmit the network descriptors to external AS's), the second AS 1004 may still receive and utilize network descriptors received in messages, as disclosed herein. Moreover, even in cases where the second AS does not have access to network descriptors for itself, it can still relay the network descriptors for other AS's. In this example, the second AS 1004 relays the network descriptors (as received from the first AS 1002) to the third AS 1006. The third AS 1006 receives the network descriptors (which correspond to the first AS 1002) from the second AS 1004. The third AS 1006 may determine and transmit its eigenvalues to the second AS 1004 at 1016 and 1018, respectively. At 1020, the second AS 1004 processes the eigenvalues received from the third AS 1006 in a manner similar to that described for 1012. Likewise, at 1022, the second AS 1004 relays the network descriptors (as received from the third AS 1006) to the first AS 1002. The first AS 1002 receives the network descriptors (which correspond to the third AS 1006) from the second AS 1004. At 1024, the first AS 1002 may process the eigenvalues corresponding to the third AS 1006. In this example, the second AS 1004 transferred network descriptors between the first AS 1002 and the third AS 1006, even though the second AS 1004 did not export its own network descriptors. Such a scenario is useful, e.g., for allowing the first AS 1002 and the third AS 1006 to exchange network descriptor data, although they are separated by an intermediate AS (i.e., the second AS), which does not export such data. As illustrated in this example, only some of the AS's need to export a network descriptor. In such cases, the network descriptors that are being exported can be used to narrow down a source of the problem between the AS's that export network descriptors. For example, network descriptors can used to determine which AS is most likely (or not likely to be a source of a network flow problem), e.g., can determine which of the first AS and the second AS has a more limiting network criticality. By process of elimination, the AS that has the lowest network criticality (i.e., has the highest available bandwidth) can, e.g., be eliminated as a potential source of the problem (leaving only the remaining two AS in this example). Thus, the potential source of the problem can be narrowed down to a smaller subset of potential AS for further inspection, e.g., using network probes.

Figure 11:
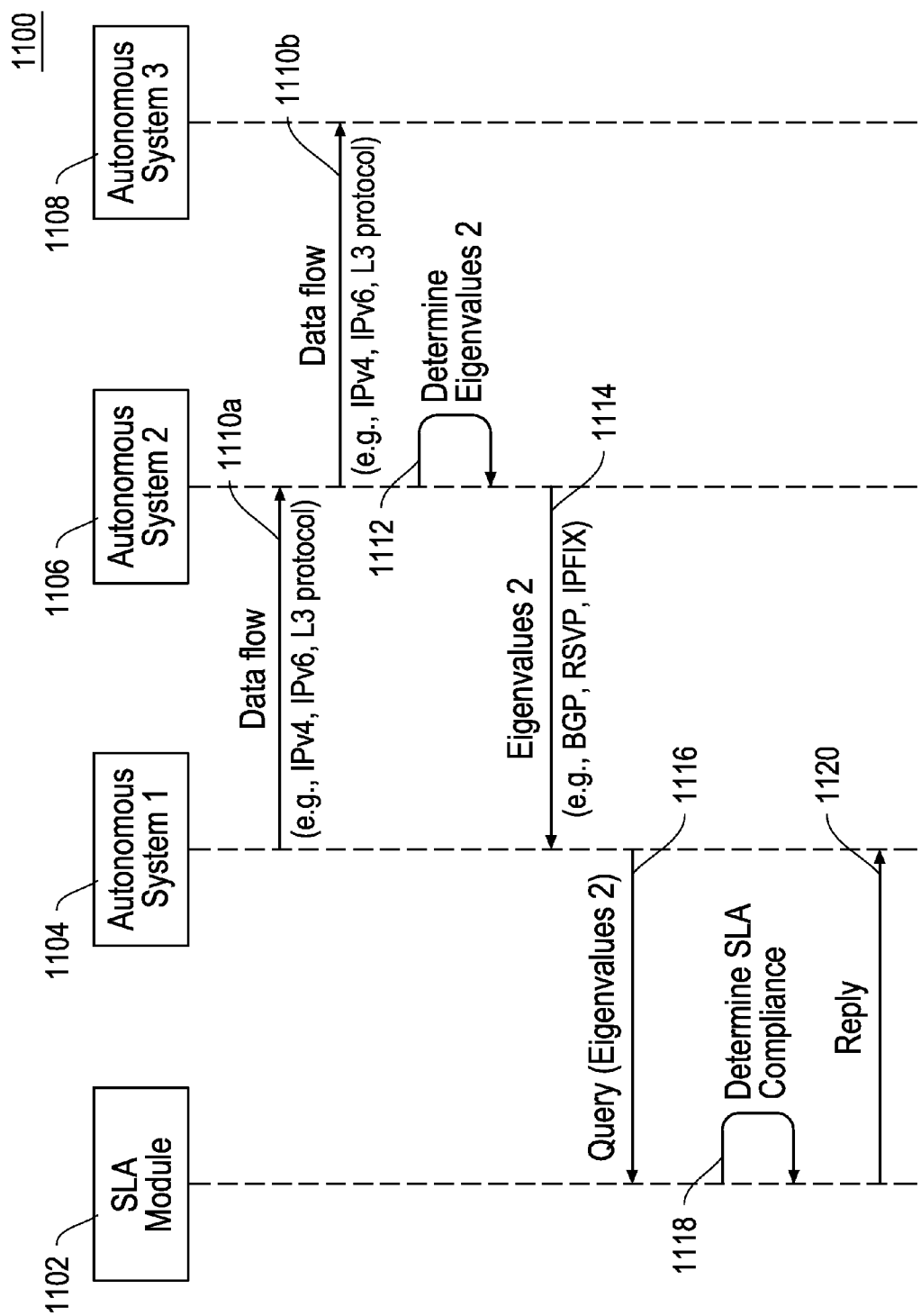

Turning to FIG. 11, FIG. 11 illustrates a system 1100 including a plurality of autonomous systems (i.e., a first AS 1104, a second AS 1106, and a third AS 1108) and a Service Level Agreement Module 1102. In this example, the first AS 1104 utilized network descriptors received from the second AS 1106 to determine whether an SLA (between the first AS 1104 and the second AS 1106) is being met by the service provided by the second AS 1106. The second AS 1106 is a service provider for the first AS 1104. In this example, the first AS 1104 routes a network flow 1110 via the second AS 1106 to the third AS 1108. The network flow 1110a is transmitted from the first AS 1106 to the second AS 1106 (i.e., the service provider). The network flow 1110b is transmitted from the second AS 1106 (i.e., the service provider) to the third AS 1108. At 1112, the second AS 1106 determines eigenvalues corresponding to the network (within the second AS 1106) over which the data flow 1110 is transmitted. At 1114, the second AS 1106 transmits the eigenvalues to the first AS 1104. The first AS 1104 receives the eigenvalues from the second AS 1106. At 1116, the first AS 1104 transmits the eigenvalues to a SLA module. At 1118, the SLA module 1102 determines whether the service provider (i.e., the second AS 1106) is complying with the SLA based, at least in part, on the eigenvalues. In some examples, the SLA may include acceptable eigenvalues and/or network criticality indices (or threshold values thereof). The eigenvalues may be included directly in the SLA to ensure performance meets the standard outline in the SAL. In other examples, the eigenvalues be used to compute the metrics that are typically included in an SLA. For example, an availability of five 9s, may correspond to a certain level of connectivity, which, in turn, maps to a specific threshold value for an eigenvalue. Some SLAs contains high level metrics that can be derived directly from the eigenvalue. In such cases, the eigenvalues, in effect, becomes the primary metric for determining whether the SLAs metrics are satisfied. In further examples, a graphical spectrum of each of different AS's is exchanged between all AS's (e.g., in manner similar to that for existing approaches to exchanging AS paths). Such exchanging of the graphical spectrum across all the AS's enables analysis/troubleshooting of network performance based on the graphical spectrum. It is noted that, contrary to approaches for exchanging AS Paths, there is no need to exchange a graphical spectrum for each path that a network flow can take. Instead, it is sufficient to known the graphical spectrum of each AS to determine the performance for a given path. This is done by looking at the graphical spectrum of each AS appearing in the path. In a particular example, the graphical spectrum will be calculated from a modified Laplacian matrix (e.g., similar to 204 of FIG. 2) as it describes the current state of utilization of the network rather than its absolute connectivity. The graphical spectrum can in turn be used to derive network criticality and overall available bandwidth which an SLA module can compare to an agreed upon threshold between the two AS's. At 1120, the SLA module 1102 transmits a reply to the first AS 1106. The reply identifies a result of the determination at 1118. For example, the reply may identify that the service provide is not complying with the SLA. In other cases, the reply may identify that the service provide is complying with the SLA. The first AS 1106 receives the reply from the SLA module 1102. The first AS 1106 may make a determination based on the reply (e.g., where the determination matches the indication of compliance in the reply).

Figure 12A:
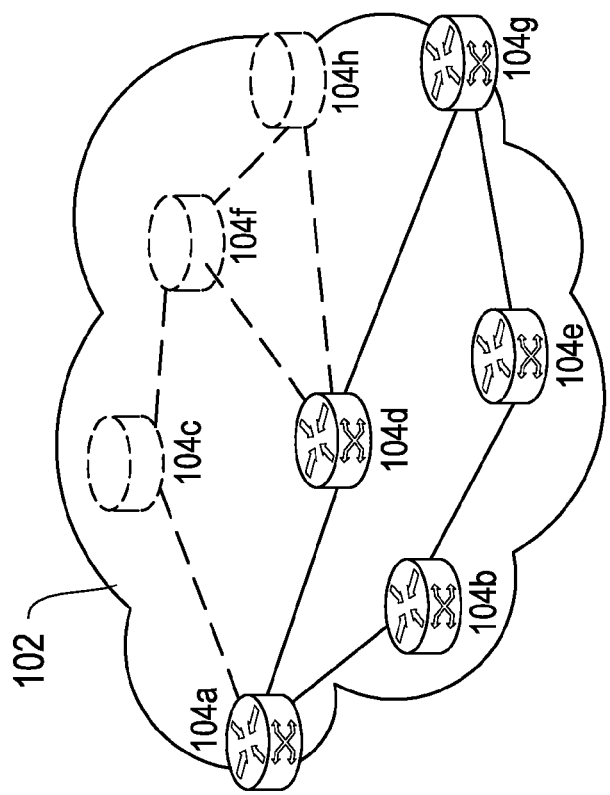
FIGS. 12A and 12B are simplified schematic diagrams illustrating possible details related to an example autonomous system of the communication system.
Figure 12B:
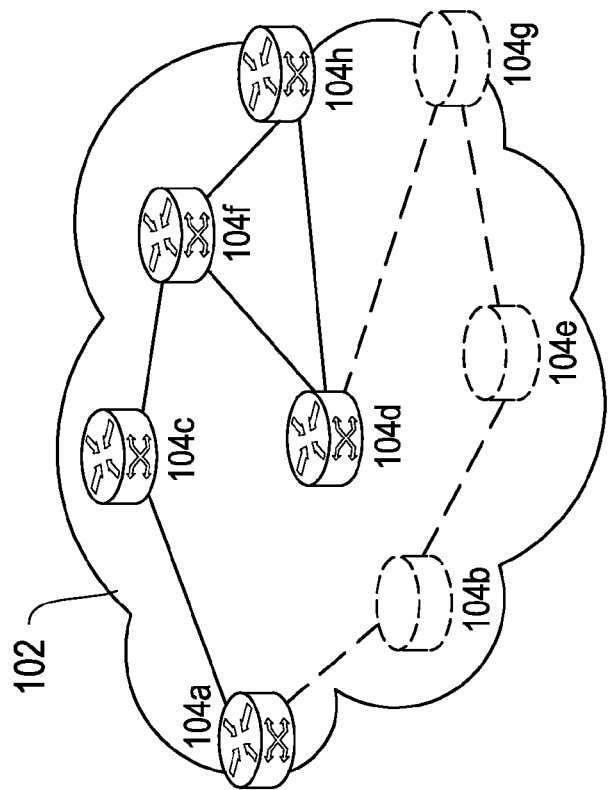

Turning to FIGS. 12A and 12B, FIGS. 12A and 12B illustrate an example of a locating a network within a particular autonomous system in which the problem is located (i.e., at the scale of networks within the AS, subnets in the AS, or individual devices within the AS and/or a subnet therein). This is an example of one of multiples scales at which an AS may be analyzed using anonymized network descriptors. In this case, the anonymized network descriptors are utilized within a single AS to identify (or narrow down) the potential sources of a network issue. Such a technique is useful to reduce the resources consumed while troubleshooting such an issue. For example, some troubleshooting tools may be computationally expensive in the sense each network element must be polled for detailed information. Performing such polling across a large set of network elements in an AS is, therefore, costly. However, the anonymized network descriptors may be utilized to reduce the "cost" by scoping-down the area in which detailed trouble shooting must be performed. For example, some AS's include multiple subnets, each identified by a different network prefix. In this example, FIG. 12A illustrate an exemplary subnet of the first as 102 of FIG. 1; the subnet of FIG. 12A corresponds to a network prefix of 128.6.1.0/24. FIG. 12B illustrates another exemplary subnet of the first as 102 of FIG. 1; the subnet of FIG. 12A corresponds to a network prefix of 128.6.2.0/24. Each of the subnets may be individually (and separately) analyzed by, for each subnet, computing a Laplacian matrix and eigenvalues of the matrix. In effect, the AS is segregate by subnet and each subnet is treated as if it were a separate AS (e.g., using the techniques described with respect to FIGS. 2 and 3A). A network criticality value is computing for each subnet. The network criticality values can be used to identify which of the segregated subsets of the network has a problem. In a data center, for example, such a process may be used to identify subset of the network for monitoring instead of monitoring all machines all of the time.

Figure 13A:
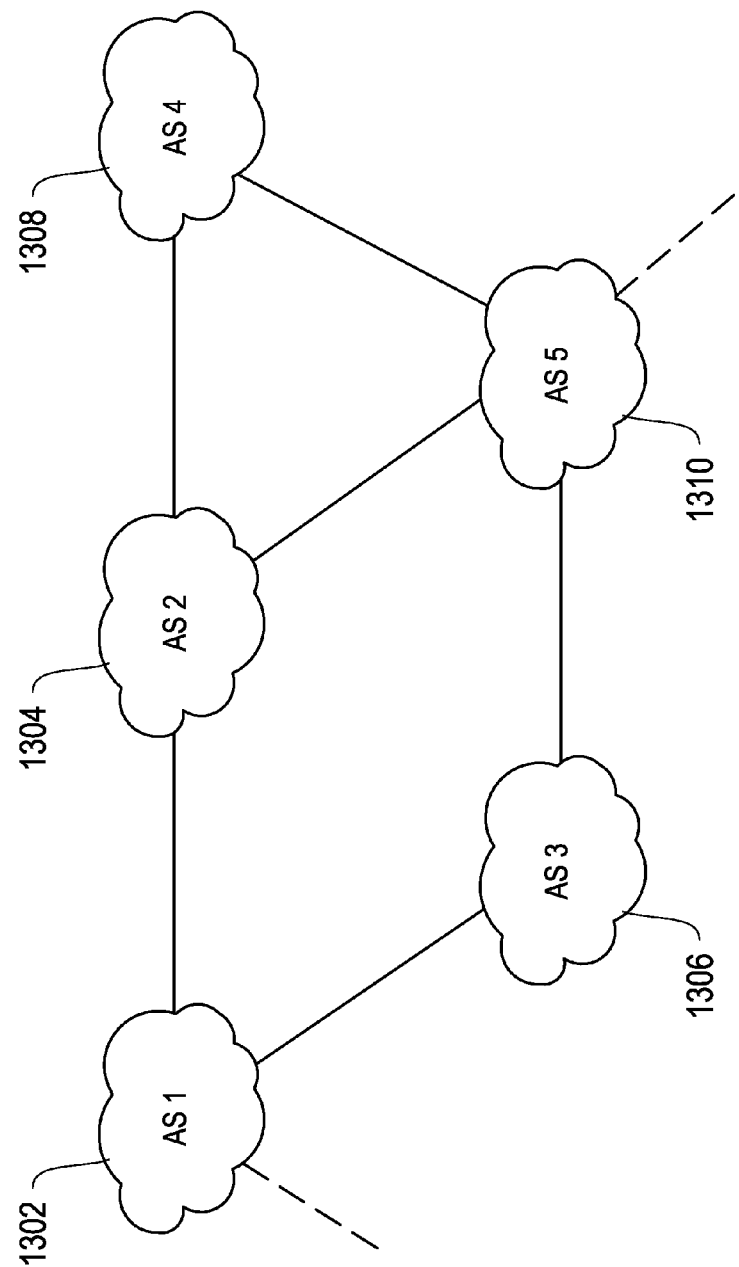
FIG. 13A is a simplified schematic diagram of a network of autonomous systems in accordance with some embodiments of the present disclosure.

When a network flow traverses multiple autonomous systems, network administrators are faced with a technical problem of trying to identify a source of network flow issues at multiple scales. FIG. 13A illustrates an example system 1300 in which such identification includes identifying which of a plurality of autonomous systems is the source (i.e., at the scale of an AS). FIG. 13A illustrates an example of one of multiples scales at which an AS may be analyzed using anonymized network descriptors. In system 1300, a plurality of AS's are coupled to one another. The system 1300 includes a first AS 1302, a second AS 1304, a third AS 1306, a fourth AS 1308, and a fifth AS 1310. Each AS's (i.e., the first AS 1302, the second AS 1304, the third AS 1306, the fourth AS 1308, and the fifth AS 1310) is operatively coupled to at least one other AS within the system 1300 as shown with solid lines between some of the AS's 1302, 1304, 1306, 1308, and 1310. The solid lines between some of the AS's 1302, 1304, 1306, 1308, and 1310 may be viewed to represent exchange of packets according to one or more EGPs, such as e.g. BGP and/or BGP-LS. The dashed lines may represent connection to other AS's not shown in the system 1300.

In this example, the AS's 1302, 1304, 1306, 1308, and 1310 may be collectively analyzed by computing a Laplacian matrix for a meta-network (e.g., a network of AS's, each of which comprises at least one network). In effect, each AS treated as if it were a separate node in the meta-network (e.g., using the techniques described with respect to FIGS. 2 and 3A). FIG. 13B illustrates an exemplary Laplacian matrix the meta-network of system 1300. The form of the Laplacian matrix in FIG. 13B follows form as described with respect to FIGS. 2 and 3A. The off-diagonal elements in a typical Laplacian matrix (e.g., as in FIG. 2 or 3A) are a function of the link between two nodes. However, the links between the different AS's may not be as critical as the links within the AS's. Thus, a key difference between a typical Laplacian matrix and the Laplacian matrix of FIG. 13B is that the off diagonal values in FIG. 13B are a function of the network criticality of each of the AS's coupled by an inter-AS link (as opposed to being a function of the link itself). For example, the off-diagonal may be of the general form $NC\_i\_j=f(NC\_i, NC\_j)$, where $NC\_i$ is the network criticality value of the AS 1; $NC\_j$ is the network criticality value of the AS j; $NC\_i\_j$ is the network criticality value of the cell at row 1 and column j (i.e., assigned to the "link" between AS i and AS j). For example the function "$f$" may be a minimum function or a maximum function. The minimum function may be used to choose the smaller of the two network criticality values for storing in the Laplacian matrix. The maximum function may be used to choose the larger of the two network criticality values for storing in the Laplacian matrix. Eigenvalues are calculated for the Laplacian matrix of the meta-network. A network criticality value is computing for each subnet. The network criticality values can be used to identify which of the segregated subsets of the network has a problem. Using such a meta-network, problems in network that traverse more than one AS may be scoped-down to identify a potential source of the problem as a single AS from a plurality of AS's. Flows may be intelligently routed based on the network criticality index. A destination may be reached through any of the AS's 1302, 1304, 1306, 1308, and 1310. Thus, the path(s) with the best criticality (i.e. the lowest criticality index) may be utilized for transmit the flow. Such an example may leverage CISCO Performance Routing (PfR) and Policy Based Routing (PBR). The inclusion of the criticality index would extend PfR/PBR beyond link metrics between AS edge routers to make decisions and would provide an approach to get a broader picture of the performance of neighboring AS's upon which to make decisions.

Within the context of the disclosure, a network used herein represents a series of points, nodes, or network elements of interconnected communication paths for receiving and transmitting packets of information that propagate through a communication system. A network offers communicative interface between sources and/or hosts, and may be any local area network (LAN), wireless local area network (WLAN), metropolitan area network (MAN), Intranet, Extranet, Internet, WAN, virtual private network (VPN), or any other appropriate architecture or system that facilitates communications in a network environment depending on the network topology. A network can comprise any number of hardware or software elements coupled to (and in communication with) each other through a communications medium.

In one particular instance, the architecture of the present disclosure can be associated with a service provider deployment. In other examples, the architecture of the present disclosure would be equally applicable to other communication environments, such as an enterprise wide area network (WAN) deployment. The architecture of the present disclosure may include a configuration capable of transmission control protocol/internet protocol (TCP/IP) communications for the transmission and/or reception of packets in a network.

As used herein in this Specification, the term 'network element' is meant to encompass any of the aforementioned elements, as well as servers (physical or virtual), end user devices, routers, switches, cable boxes, gateways, bridges, load balancers, firewalls, inline service nodes, proxies, processors, modules, or any other suitable device, component, element, proprietary appliance, an edge router, a network controller, or object operable to exchange, receive, and transmit information in a network environment. These network elements may include any suitable hardware, software, components, modules, interfaces, or objects that facilitate the transfer of anonymized network descriptors. This may be inclusive of appropriate algorithms and communication protocols that allow for the effective exchange of data or information.

In one implementation, the network descriptor modules, systems, network elements, edge routers, core routers, and the like described herein may include software to achieve (or to foster) the functions discussed herein for enabling transmission of anonymized network descriptors where the software is executed on one or more processors to carry out the functions. This could include the implementation of instances of network descriptor modules, systems, network elements, edge routers, core routers and/or any other suitable element that would foster the activities discussed herein. Additionally, each of these elements can have an internal structure (e.g., a processor, a memory element, etc.) to facilitate some of the operations described herein. In other embodiments, these functions for transmission of anonymized network descriptors may be executed externally to these elements, or included in some other network element to achieve the intended functionality. Alternatively, network descriptor modules, network elements, edge routers, core routers may include software (or reciprocating software) that can coordinate with other network elements in order to achieve the functions for transmission of anonymized network descriptors as described herein. In still other embodiments, one or several devices may include any suitable algorithms, hardware, software, components, modules, interfaces, or objects that facilitate the operations thereof.

In certain example implementations, the functions for transmission of anonymized network descriptors outlined herein may be implemented by logic encoded in one or more non-transitory, tangible media (e.g., embedded logic provided in an application specific integrated circuit [ASIC], digital signal processor [DSP] instructions, software [potentially inclusive of object code and source code] to be executed by one or more processors, or other similar machine, etc.). In some of these instances, one or more memory elements can store data used for the operations described herein. This includes the memory element being able to store instructions (e.g., software, code, etc.) that are executed to carry out the activities described in this Specification. The memory element is further configured to store databases such as mapping databases to anonymized network descriptors disclosed herein. The processor can execute any type of instructions associated with the data to achieve the operations detailed herein in this Specification. In one example, the processor could transform an element or an article (e.g., data) from one state or thing to another state or thing. In another example, the activities outlined herein may be implemented with fixed logic or programmable logic (e.g., software/computer instructions executed by the processor) and the elements identified herein could be some type of a programmable processor, programmable digital logic (e.g., a field programmable gate array [FPGA], an erasable programmable read only memory (EPROM), an electrically erasable programmable ROM (EEPROM)) or an ASIC that includes digital logic, software, code, electronic instructions, or any suitable combination thereof.

Any of these elements (e.g., the network elements, etc.) can include memory elements for storing information to be used in achieving the anonymized network descriptors, as outlined herein. Additionally, each of these devices may include a processor that can execute software or an algorithm to perform the graph-theoretic or spectral-theoretic techniques as discussed in this Specification. These devices may further keep information in any suitable memory element [random access memory (RAM), ROM, EPROM, EEPROM, ASIC, etc.], software, hardware, or in any other suitable component, device, element, or object where appropriate and based on particular needs. Any of the memory items discussed herein should be construed as being encompassed within the broad term 'memory element.' Similarly, any of the potential processing elements, modules, and machines described in this Specification should be construed as being encompassed within the broad term 'processor.' Each of the network elements can also include suitable interfaces for receiving, transmitting, and/or otherwise communicating data or information in a network environment.

Additionally, it should be noted that with the examples provided above, interaction may be described in terms of two, three, or four network elements. However, this has been done for purposes of clarity and example only. In certain cases, it may be easier to describe one or more of the functionalities of a given set of flows by only referencing a limited number of network elements. It should be appreciated that the systems described herein are readily scalable and, further, can accommodate a large number of components, as well as more complicated/sophisticated arrangements and configurations. Accordingly, the examples provided should not limit the scope or inhibit the broad techniques of functions for transmission of anonymized network descriptors, as potentially applied to a myriad of other architectures.

It is also important to note that the procedures in the FIGS. 7, 8, 9, 10, and 11 illustrate only some of the possible scenarios that may be executed by, or within, the systems, methods, and apparatuses described herein. Some of these procedures may be deleted or removed where appropriate, or these procedures may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by the systems, methods, and apparatuses in that any suitable arrangements, chronologies, configurations, and timing mechanisms may be provided without departing from the teachings of the present disclosure.

It should also be noted that many of the previous discussions may imply a single client-server relationship. In reality, there is a multitude of servers in the delivery tier in certain implementations of the present disclosure. Moreover, the present disclosure can readily be extended to apply to intervening servers further upstream in the architecture, though this is not necessarily correlated to the 'm' clients that are passing through the 'n' servers. Any such permutations, scaling, and configurations are clearly within the broad scope of the present disclosure.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method comprising:
   exchanging anonymized network topology data between autonomous systems by:
   accessing, by an edge router located in a first autonomous system, at least one eigenvalue, wherein the at least one eigenvalue anonymizes network topology data associated with the first autonomous system to produce the anonymized network topology data;
   encoding, by the edge router using a routing protocol, the at least one eigenvalue into a routing message; and
   transmitting, by the edge router, the routing message to an external edge router located in a second autonomous system.

2. The method of claim 1, wherein the routing protocol is a standardized border gateway protocol (BGP) that is extended to include the anonymized network topology data and the routing message is a network layer reachability information (NLRI) tuple comprising: a type field and a value field; and
   wherein the encoding the at least one eigenvalue into the routing message comprises:
   encoding an identifier corresponding to anonymous topology data into the type field of the NLRI tuple, and
   encoding the at least one eigenvalue into the value field of the NLRI tuple.

3. The method of claim 1, wherein the routing message is an Internet protocol flow information export (IPFIX) data record; and
   wherein the encoding the at least one eigenvalue into the routing message comprises:
   encoding, in an IPFIX template record, an identifier corresponding to an eigenvalue field into an information element identifier field of a field specifier, and
   encoding the at least one eigenvalue into a field value of the IPFIX data record.

4. The method of claim 1, wherein the accessing the at least one eigenvalue comprises:
   retrieving the network topology data from a memory, wherein the network topology data comprises a matrix, the matrix comprises a plurality of values, and the plurality of values correspond to connections between network elements within the first autonomous system;
   calculating eigenvalues of the matrix using the plurality of values; and
   retrieving the at least one eigenvalue from the eigenvalues of the matrix.

5. The method of claim 4, wherein all of the network elements are associated with a same network prefix and the same network prefix is one of a plurality of network prefixes within the first autonomous system, and wherein the eigenvalues of the matrix are calculated using the plurality of values corresponding to the connections between the network elements that are associated with the same network prefix.

6. The method of claim 4, further comprising:
   receiving information indicative of a problem in a data flow, the data flow spanning the first autonomous system and the second autonomous system;
   calculating a first value of network criticality based on the eigenvalues of the matrix; and
   calculating a second value of network criticality based on other eigenvalues corresponding to the second autonomous system.

7. The method of claim 4, wherein each diagonal element of the matrix identifies a degree of one of the network elements within the first autonomous system; and
   wherein one or more non-diagonal elements of the matrix identify, at least in part, connectivity between two of the network elements within the first autonomous system.

8. A method comprising:
   exchanging anonymized network topology data between autonomous systems by:
   receiving, by an edge router located in a first autonomous system, a routing message from an external network element located in a second autonomous system, wherein the routing message is encoded based on a routing protocol and comprises an eigenvalue corresponding to the anonymized network topology data, and accessing, by the edge router, one or more other eigenvalues, each of the one or more other eigenvalues corresponding to an autonomous system that is different from the first autonomous system;

analyzing, by the edge router, each of the one or more other eigenvalues and the eigenvalues; and executing, by the edge router, a network diagnostic action based on the analyzing.

9. The method of claim 8, wherein the analyzing comprises:

calculating a first value of network criticality based on the eigenvalue; and calculating at least one additional value of network criticality based on at least one of the one or more other eigenvalues.

10. The method of claim 8, wherein the routing protocol is a standardized border gateway protocol (BGP) that is extended to include the anonymized network topology data and the routing message is a network layer reachability information (NLRI) tuple comprising: a type field and a value field; and wherein the routing message being encoded based on the routing protocol and comprising the eigenvalue comprises: the type field in the NLRI tuple being encoded containing an identifier corresponding to anonymous topology data, and the value field of the NLRI tuple being encoded containing the eigenvalue.

11. The method of claim 8, wherein the routing message is an Internet protocol flow information export (IPFIX) data record; and wherein the routing message being encoded based on the routing protocol and comprising the eigenvalue comprises:

a field value of the IPFIX data record being encoded to contain the eigenvalue; a identifier field of the IPFIX data record being encoded to contain a set identifier that matches a template identifier of an IPFIX template record.

12. A network element located in a first autonomous system, the network element comprising:

a memory element storing electronic code;

a processor coupled to the memory element and operable to execute the electronic code, wherein the processor, when executing the electronic code, performs operations comprising:

exchanging anonymized network topology data between autonomous systems by:

accessing at least one eigenvalue, wherein the at least one eigenvalue anonymizes network topology data associated with the first autonomous system to produce the anonymized network topology data;

encoding, using a routing protocol, the at least one eigenvalue into a routing message; and transmitting the routing message to an external edge router located in a second autonomous system.

13. The network element of claim 12, wherein the routing protocol is a standardized border gateway protocol (BGP) that is extended to include the anonymized network topology data and the routing message is a network layer reachability information (NLRI) tuple comprising: a type field and a value field; and wherein the encoding the at least one eigenvalue into the routing message comprises:

encoding an identifier corresponding to anonymous topology data into the type field of the NLRI tuple, and encoding the at least one eigenvalue into the value field of the NLRI tuple.

14. The network element of claim 12, wherein the routing message is an Internet protocol flow information export (IPFIX) data record; and wherein the encoding the at least one eigenvalue into the routing message comprises:

encoding, in an IPFIX template record, an identifier corresponding to an eigenvalue field into an information element identifier field of a field specifier, and encoding the at least one eigenvalue into a field value of the IPFIX data record.

15. The network element of claim 12, wherein the accessing the at least one eigenvalue comprises:

retrieving the network topology data from the memory element, wherein the network topology data comprises a matrix, the matrix comprises a plurality of values, and the plurality of values correspond to connections between network elements within the first autonomous system;

calculating eigenvalues of the matrix using the plurality of values; and retrieving the at least one eigenvalue from the eigenvalues of the matrix.

16. The network element of claim 15, wherein all of the network elements are associated with a same network prefix and the same network prefix is one of a plurality of network prefixes within the first autonomous system, and wherein the eigenvalues of the matrix are calculated using the plurality of values corresponding to the connections between the network elements that are associated with the same network prefix.

17. The network element of claim 15, wherein the operations further comprise:

receiving information indicative of a problem in a data flow, the data flow spanning the first autonomous system and the second autonomous system;

calculating a first value of network criticality based on the eigenvalues of the matrix; and calculating a second value of network criticality based on other eigenvalues corresponding to the second autonomous system.

18. The system of claim 15, wherein each diagonal element of the matrix identifies a degree of one of the network elements within the first autonomous system; and wherein one or more non-diagonal elements of the matrix identify, at least in part, connectivity between two of the network elements within the first autonomous system.

19. A network element located in a first autonomous system comprising:

a memory element storing electronic code; and a processor coupled to the memory element and operable to execute the electronic code, wherein the processor, when executing the electronic code, performs operations comprising:

exchanging anonymized network topology data between autonomous systems by:

receiving a routing message from an external network element located in a second autonomous system, wherein the routing message is encoded based on a routing protocol and comprises an eigenvalue corresponding to the anonymized network topology data, and accessing one or more other eigenvalues, each of the one or more other eigenvalues corresponding to an autonomous system that is different from the first autonomous system;

analyzing each of the one or more other eigenvalues and the eigenvalue; and executing a network diagnostic action based on the analyzing.

20. The network element of claim 19, wherein the analyzing comprises:

calculating a first value of network criticality based on the eigenvalue; and calculating at least one additional value of network criticality based on at least one of the one or more other eigenvalues.

21. The network element of claim 19, wherein the routing protocol is a standardized border gateway protocol (BGP) that is extended to include the anonymized network topology data and the routing message is a network layer reachability information (NLRI) tuple comprising: a type field and a value field; and wherein the routing message being encoded, based on the routing protocol, comprising the eigenvalue comprises: the type field in the NLRI tuple being encoded containing an identifier corresponding to anonymous topology data, and the value field of the NLRI tuple being encoded containing the eigenvalue.

22. The network element of claim 19, wherein the routing message is an Internet protocol flow information export (IPFIX) data record; and wherein the routing message being encoded based on the routing protocol and comprising the eigenvalue comprises:

a field value of the IPFIX data record being encoded to contain the eigenvalue; a identifier field of the IPFIX data record being encoded to contain a set identifier that matches a template identifier of an IPFIX template record.

23. A computer-readable non-transitory medium comprising one or more instructions, that when executed on a processor configure the processor to perform one or more operations comprising:

exchanging anonymized network topology data between autonomous systems by:

accessing, by an edge router located in a first autonomous system, at least one eigenvalue, wherein the at least one eigenvalue anonymizes network topology data associated with the first autonomous system to produce the anonymized network topology data;

encoding, by the edge router using a routing protocol, the at least one eigenvalue into a routing message; and transmitting, by the edge router, the routing message to an external edge router located in a second autonomous system.

24. A computer-readable non-transitory medium comprising one or more instructions, that when executed on a processor configure the processor to perform one or more operations comprising:

exchanging anonymized network topology data between autonomous systems by:

receiving, by an edge router located in a first autonomous system, a routing message from an external network element located in a second autonomous system, wherein the routing message is encoded based on a routing protocol and comprises an eigenvalue corresponding to the anonymized network topology data, and accessing, by the edge router, one or more other eigenvalues, each of the one or more other eigenvalues corresponding to an autonomous system that is different from the first autonomous system;

analyzing, by the edge router, each of the one or more other eigenvalues and the eigenvalue; and executing, by the edge router, a network diagnostic action based on the analyzing.

* * * * *